(12) United States Patent
Khan et al.

(10) Patent No.: US 9,864,701 B1
(45) Date of Patent: Jan. 9, 2018

(54) RESOURCE MAPPING FOR AN INPUT/OUTPUT DEVICE

(71) Applicant: Amazon Technologies, Inc., Seattle, WA (US)

(72) Inventors: Asif Khan, Cedar Park, TX (US); Rahul Gautam Patel, Austin, TX (US); Mark Bradley Davis, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 299 days.

(21) Appl. No.: 14/643,932

(22) Filed: Mar. 10, 2015

(51) Int. Cl.
*G06F 12/1081* (2016.01)
*G06F 12/06* (2006.01)
*G06F 13/10* (2006.01)

(52) U.S. Cl.
CPC ...... *G06F 12/1081* (2013.01); *G06F 12/0653* (2013.01); *G06F 13/102* (2013.01); *G06F 2212/1041* (2013.01); *G06F 2212/154* (2013.01); *G06F 2212/657* (2013.01)

(58) Field of Classification Search
CPC .................. G06F 12/1081; G06F 12/0653
See application file for complete search history.

(56) References Cited

U.S. PATENT DOCUMENTS

| | | | | |
|---|---|---|---|---|
| 6,665,788 B1 * | 12/2003 | Hughes | ............. | G06F 12/1027 345/566 |
| 6,751,583 B1 * | 6/2004 | Clarke | ............. | G06F 17/5022 703/17 |
| 2006/0136720 A1 * | 6/2006 | Armstrong | ............. | G06F 21/53 713/164 |
| 2010/0185782 A1 * | 7/2010 | Watkins | ............. | G06F 12/0284 710/3 |
| 2015/0127993 A1 * | 5/2015 | Sankar | ............. | G06F 11/3466 714/45 |

OTHER PUBLICATIONS

Intel® IOP331 I/O Processor Chipset. Overview [online]. Intel Corporation, Nov. 2014 [retrieved on Aug. 3, 2015]. Retrieved from the Internet: <URL: http://www.intel.com/design/iio/iop331.htm>, 2 pages. (plus 2 pages of publication date support documentation from www.archive.org).

Nijjar, Satinder. How to Build a Better Data Center with Oracle Virtual Networking and Oracle VM Server for x86 [online]. Oracle, Jul. 24, 2013 [retrieved on Aug. 3, 2015]. Retrieved from the Internet: <URL: http://www.oracle.com/technetwork/articles/servers-storage-admin/ovn-build-better-datacenter-1979838.html>, 20 pages.

* cited by examiner

*Primary Examiner* — Farley Abad
(74) *Attorney, Agent, or Firm* — Kilpatrick Townsend & Stockton LLP

(57) ABSTRACT

One or more resources for an SoC can be directly mapped to a host address space in a host system as peripheral bus functions. A translation unit can provide translation between the host address space and an SoC address space for transactions targeted for a resource from the one or more resources to facilitate performing the transactions with the resource using the host address space. Some embodiments of the technology can provide peer to peer capability for communication between the SoC resources using the translation unit.

20 Claims, 12 Drawing Sheets

RESOURCE MAPPING FOR AN INPUT/OUTPUT DEVICE

BACKGROUND

Computer networks may typically include a plurality of servers that can host data and provide services to multiple clients or organizations. The clients or organizations can use these services or data to power a wide variety of workloads such as storage, data processing and warehousing, web and mobile applications, archive and many other tasks. Generally, clients request services or data from a host system and the host system responds by executing certain tasks to service the request and/or provide the data over the network.

In some instances, the host system may communicate with an intelligent Input/Output (I/O) device. For example, the intelligent I/O device may include a plurality of resources such as memories, peripherals, etc. In some implementations, a system on a chip (SoC) may perform as an intelligent I/O device to a root complex processor on the host system. In most instances, in order for the host system to access a resource associated with the SoC, the host system has to communicate through a processor on the SoC. For example, the SoC processor may access the resource on behalf of the host system. The resource can send a response back to the SoC processor, wherein the SoC can forward the response back to the host system. Similarly, resources on the SoC or coupled to the SoC also need to use the processor on the SoC and potentially also the host processor to facilitate peer-to-peer communication between the resources. This may result in additional processing and interrupts in the system and, in general, higher latency for accessing an SoC resource by the host system, thus reducing the throughput of the system.

BRIEF DESCRIPTION OF THE DRAWINGS

Various embodiments in accordance with the present disclosure will be described with reference to the drawings, in which.

DETAILED DESCRIPTION

Figure 1:
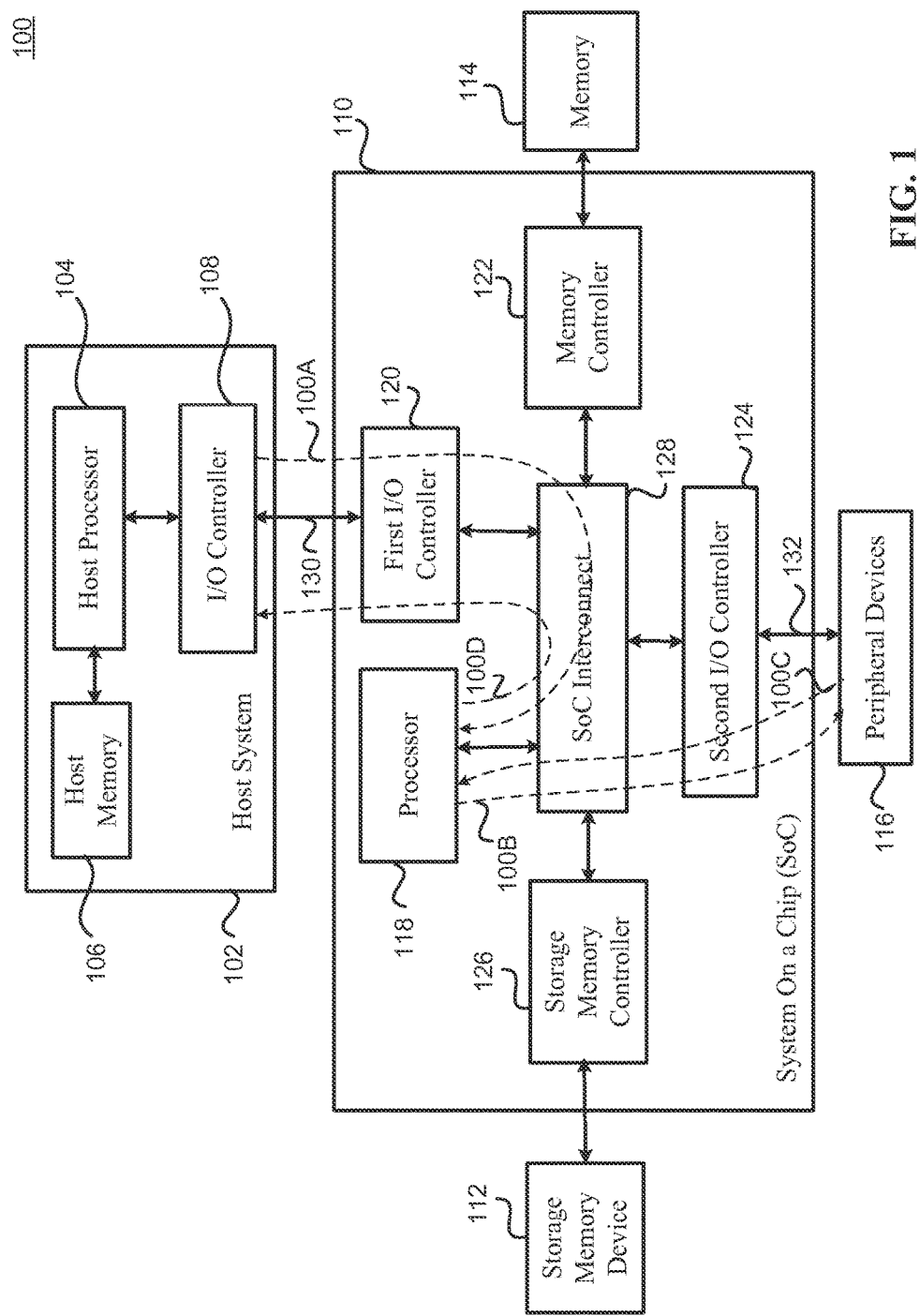
FIG. 1 illustrates a typical flow for a system for processing I/O transactions.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Generally speaking, accesses to various resources for an SoC configured as an intelligent input/output (I/O) device may go through a processor on the SoC. For example, I/O requests to access a peripheral or a memory for the SoC by a host system may have to be processed by the processor on the SoC first. Similarly, in most instances, peer-to-peer communication among different resources for the SoC may include interaction with the host system. This may result in extra cycles for accessing the peripheral or the memory and hence may reduce throughput of the system.

Various embodiments of the disclosed technologies can facilitate streamlined communication between a host system with a plurality of hardware resources associated with an SoC, bypassing significant SoC processor involvement and/or peer-to-peer communication between resources associated with the SoC, bypassing significant SoC processor or host system involvement. The plurality of hardware resources may include one or more resources on the SoC and one or more resources coupled to the SoC. Some non-limiting examples of the hardware resources may include video cards, networking card, SATA (Serial Advanced Technology Attachment), memory, etc.

In some embodiments, each of the one or more resources associated with the SoC may be mapped to the host system as peripheral bus functions. For example, the one or more resources may be mapped as PCIe (Peripheral Component Interconnect Express) functions, USB (Universal Serial Bus) functions or any other suitable peripheral bus function. For example, in some implementations, for an SoC coupled to the host system using PCIe interconnects and PCIe protocols, each of the resources associated with the SoC may be mapped to one or more host address spaces as PCIe functions (physical and/or virtual). For example, the one or more host address spaces may include configuration space and memory mapped I/O space. The host system can access any one of the resources associated with the SoC directly by accessing the peripheral bus function (associated with the resource) mapped in the appropriate host address space. In some implementations, a translation unit on the SoC may translate the host address to the target SoC address for that resource using a mapping between the peripheral bus function (or host addresses associated with the peripheral bus function) and the corresponding SoC address from the SoC address space. Therefore, the communication between the host system and the SoC resource may be performed without significant involvement of the SoC processor. Similarly, as discussed in further detail below, the translation unit on the SoC may facilitate peer-to-peer communication between various resource associated with the SoC.

An SoC may include access to a plurality of hardware resources, e.g., memories and peripherals. Typically, one or more resources from the plurality of hardware resources may be on the SoC (e.g., on-chip resources) and one or more resources from the plurality of hardware resources may be coupled to the SoC (e.g., off-chip resources) via one or more interfaces. In addition, the SoC may include one or more compute subsystems and an interconnect that may be configured to connect to the one or more compute subsystems and the one or more resources. For example, in some implementations, the SoC may include one or more processor cores, memory controllers, storage memory controllers, I/O controllers and various interfaces. Typically, the processor on the SoC has direct access to all the resources for the SoC. For example, each resource may be memory mapped to an SoC address space. A host system communicatively coupled to the SoC may communicate through the processor on the SoC to access the SoC resources. For example, the SoC processor may process the I/O transactions for the host system and form responses back to the host system. In some instances, the I/O transactions may include access to SoC resources such as DRAM (Dynamic Random Access Memory), SATA (Serial Advanced Technology Attachment), PCIe (Peripheral Component Interconnect Express) peripherals, etc. Typically, these I/O transactions are indirect since they go through the processor on the SoC, which proxy the requests from the host system processor. These indirect accesses have higher latency than if the host system processor had the peripherals directly attached.

Various embodiments of the disclosed technologies can provide a direct interface between the host system and the SoC resources (e.g., peripherals, memories, etc.) by mapping the SoC resources directly to the host address space. In some embodiments, the one or more SoC resources may be mapped as peripheral bus functions to the host address space. The SoC resources may also be mapped to an SoC address space. For example, one or more resources may be on the SoC (e.g., on-chip resources) and/or the one or more resources may be coupled to the SoC (e.g., off-chip resources) via one or more interfaces. According to some embodiments, a translation unit can provide the necessary translation between the host address space and the SoC address space to facilitate performing of I/O transactions with the SoC using the host address space. In some embodiments, the I/O transactions can be performed between the host system and one of the resources for the SoC without any interaction with the SoC processor. For example, an I/O transaction can be performed between the host system and one of the SoC resources that may be on the SoC or coupled to the SoC. In some embodiments, peer-to-peer transactions can be performed between different resources for the SoC without any or significant interaction with the host system. For example, an I/O transaction can be performed between a first resource and a second resource, wherein each of the first resource and the second resource can be on the SoC or coupled to the SoC.

In some embodiments, the SoC can present itself as a multi-function device to the host processor. For example, in some implementations, the SoC resources can be directly mapped as PCIe functions, USB functions or any suitable peripheral bus function to the host processor. In some embodiments, direct mapping implementation may vary based on the type of SoC resource being mapped. For example, in some implementations, local I/O resources (e.g., on-chip resources such as memories) can be presented as emulated PCIe devices to the host system. In some implementations, PCIe attached devices (e.g., Network Interface Controllers, USB devices, etc.) can be passed through as PCIe functions to the host system. In some embodiments, the SoC may implement configuration space for emulated PCIe devices. The local I/O resources may be directly mapped to the host address space with some address translation, e.g., from the host address space to the SoC address space.

In some embodiments, the SoC may directly map a PCIe attached device to the host address space. For example, there may be address translation between the host address space (both configuration and Memory Mapped Input Output (MMIO) address space) and the address space of the PCIe attached device. In some implementations, a first PCIe controller can be used to connect to the host system and a second PCIe controller can be used to connect to the PCIe attached device. For example, the first PCIe controller can be used in the end point mode to communicate with a host PCIe controller that is configured in the root complex mode. The second PCIe controller can be used in the root complex mode to connect to an end point device, e.g., peripheral devices. Note that even though some embodiments of the disclosed technologies are described using PCIe protocol, it will be understood that the embodiments of the disclosed technology can be implemented using other suitable protocols such as USB, PCI, PCI-X, etc.

FIG. 1 illustrates a typical flow for processing I/O transactions in a system 100. The system 100 may include an SoC that may be configured as an intelligent input/output (I/O) device for a host system. Generally, the I/O transactions are processed by a processor in the SoC for the host system.

FIG. 1 illustrates an SoC 110 configured to communicate with a host system 102 using an interface 130. For example, the interface 130 may be a PCIe (Peripheral Component Interconnect Express) interface. In some implementations, the SoC 110 can be coupled to the host system 102 using a plug-in card or soldered on the motherboard of the host system 102.

In some instances, the host system 102 may provide a multi-tenant platform to multiple clients. For example, the host system 102 may provide services such as cloud computing, cloud storage, analytics, web services, databases, applications, deployment services, etc., to different clients. The host system 102 may include a host processor 104, a host memory 106 and an I/O controller 108.

The host processor 104 may be a multi-core processor or a server processor. A multi-core processor may include multiple processing units within the same processor. The host processor 104 may be configured to execute a plurality of instructions collectively on one or more processors of the processor cores. The instructions may be stored on a computer-readable storage medium, for example, in the form of a computer program. The computer-readable storage medium may be non-transitory. For example, in some implementations, the computer-readable storage medium may be part of the host memory 106.

The host memory 106 may include a main memory, e.g., DRAM (Dynamic Random Access Memory) or DDR SDRAM (Double Data Rate Synchronous Dynamic Random Access Memory). The host memory 106 may be internal or external to the host system 102 and may be coupled to a memory controller (not shown), e.g., a DRAM controller.

The I/O controller 108 may generate a request for an I/O transaction on behalf of the host processor 104. In some implementations, the I/O controller 108 may be a PCIe controller. For example, the I/O controller 108 may be configured in the root complex (RC) mode to allow the host processor 104 to communicate with the SoC 110 using the PCIe interface, e.g., the interface 130. In some implementations, the root complex functionality may be implemented within the host processor 104. The I/O controller 108 may be configured to generate transaction requests on behalf of the host processor 104. For example, the I/O controller 108 may generate configuration, memory and I/O requests on behalf of the host processor 104 for the SoC 110. The I/O controller 108 may include one or more ports to connect to other PCIe devices and/or switches, e.g., the first I/O controller 120. In some implementations, the I/O controller 108 may perform as a requestor to initiate a transaction or as a completer of the transaction. For example, the I/O controller 108 may perform as a requestor to initiate an I/O transaction targeted for a resource for the SoC 110. The I/O controller 108 may also receive a response from the SoC for the transaction and may perform as a completer by forwarding the response to the host processor 104.

The SoC 110 may include a processor 118, a first I/O controller 120, memory controller 122, a second I/O controller 124, storage memory controller 126 and an SoC interconnect 128. The SoC 110 may be coupled to a storage memory device 112, memory 114 and peripheral devices 116.

In some implementations, the processor 118 may be a multi-core processor. A multi-core processor may include multiple processing units within the same processor. The processor 118 may be configured to execute a plurality of instructions collectively on one or more processors of the processor cores. The instructions may be stored on a computer-readable storage medium, for example, in the form of a computer program. The computer-readable storage medium may be non-transitory. In some implementations, the multi-core processors may share certain resources, such as busses and cache hierarchies (e.g., Level 1 (L1) cache, Level 2 (L2) cache and Level 3 (L3) cache) between multiple-cores. In some instances, each core in a single or multi-core processor may also include multiple executing logical processors (or threads). Some of the non-limiting examples of the multi-core processors may include ARM's cortex A57, MIPS, AMD Phenom, Intel ATOM, etc.

The first I/O controller 120 may be configured to communicate with the I/O controller 108 via the interface 130. In some implementations, the first I/O controller 120 may be a PCIe controller. For example, the first I/O controller 120 may be configured in the end point (EP) mode to perform as an intelligent I/O device to a root complex, e.g., host I/O controller 108. In some implementations, the first I/O controller 120 may be configured to send an I/O transaction request to the processor 118 targeted for a resource for the SoC 110. The first I/O controller 120 may also be configured to receive a response from the processor 118 for the transaction and may forward the response to the host processor 104.

The memory controller 122 may include DRAM controllers, DDR controllers or any suitable controllers and may be used to manage the access to the memory 114. The memory 114 may be implemented as a DRAM, DDRx SDRAM or any other suitable implementation. In some implementations, the memory 114 may include program memory and data memory for the SoC 110. The memory 114 may be internal or external to the SoC 110.

The SoC interconnect 128 may be configured to connect one or more components of the SoC 110. For example, the SoC interconnect 128 may connect to the processor 118, the first I/O controller 120, the second I/O controller 124, the memory controller 122 and the storage memory controller 126. The SoC interconnect 128 may be implemented as an interconnect fabric, a switch, buses, cross bars, mesh or any combination thereof.

The storage memory controller 126 may be configured to manage access to the storage memory device 112. For example, in some implementations, the storage memory controller 126 may be SATA controllers and the storage memory device 112 may be a SATA drive (e.g., hard disc drive or optical drive). In some implementations, the storage memory controller 126 may be integrated with the storage memory device 112 and may be internal or external to the SoC 110.

The second I/O controller 124 may be configured to communicate with the one or more peripheral devices 116 using an interface 132. In some implementations, the second I/O controller 124 may be a PCIe controller that can be configured in the root complex (RC) mode. For example, the second I/O controller 124 may be configured as a root complex to communicate with the peripheral devices 116 (in end point mode) using a PCIe interface (e.g., interface 132).

The peripheral devices 116 may include one or more peripheral devices coupled to the SoC 110. For example, in some implementations, the one or more peripheral devices may be attached to the SoC 110 using a PCIe interface (e.g., interface 132). The peripheral devices 116 may include network devices (e.g., Ethernet MACs, network controllers, Wi-Fi devices, etc.), audio devices, USB (Universal Serial Bus) devices, storage devices or any other PCIe peripherals. For example, in some implementations, a first peripheral device in the peripheral devices 116 may be a network interface controller (NIC) and a second peripheral device may be a USB device.

Typically, the SoC resources (e.g., local peripherals, memories, attached peripheral devices, etc.) are mapped directly to the memory space of the SoC 110 and are not mapped directly to the host system 102. For example, in typical systems, the host system 102 may not interface directly with the SoC 110 resources and may interact with the processor 118 in order to communicate with the SoC 110 resources for I/O transactions. A typical flow for performing an I/O transaction using the system 100 can be described as follows.

At step 100A, the host system 102 can send a transaction request to the SoC 110. For example, the transaction request can be to access a peripheral device 116 or a memory (112 or 114) associated with the SoC 110. In some implementations, the I/O controller 108 may send the transaction request on behalf of the host processor 104. For example, in some implementations, the host processor 104 may perform as the root processor and configure the I/O controller 108 in the root complex (RC) mode. The I/O controller 108 may communicate with the first I/O controller 120 via a PCIe interface (e.g., interface 130). The first I/O controller 120 may be configured as an end point (EP) that can respond to the transaction initiated by the I/O controller 108. The first I/O controller 120 may forward the transaction to the processor 118 via the SoC interconnect 128. The processor 118 may be configured to process the transaction. For example, the processor 118 may determine that the transaction corresponds to accessing a first peripheral from the peripheral devices 116 on behalf of the host system 102, e.g., by decoding an address associated with the transaction request.

At step 100B, the processor 118 may forward the transaction to the appropriate peripheral, e.g., the first peripheral from the peripheral devices 116. For example, in some implementations, the processor 118 may forward the transaction to the second I/O controller 124 via the SoC interconnect 128. In some implementations, the second I/O controller 124 may be configured in the root complex mode and may communicate with the peripheral devices 116 via a PCIe interface (e.g., interface 132). For example, the second I/O controller 124 may send the transaction to the first peripheral from the peripheral devices 116 on behalf of the processor 118.

At step 100C, the first peripheral from the peripheral devices 116 may perform the transaction and send a response to the processor 118 for the transaction request. For example, if the transaction involved a write operation to a peripheral register, the first peripheral device may execute the write operation and send back an acknowledgement. If the transaction request was a read operation from a peripheral register, the first peripheral device may execute the read operation and send the data read from the peripheral register to the second I/O controller 124. The second I/O controller 124 may send the data in the transaction response back to the processor 118 through the SoC interconnect 128.

At step 100D, the processor 118 may send the transaction response back to the host system 102. For example, the processor 118 may determine that the response is targeted for the host system 102 and send the response to the first I/O controller 120 via the SoC interconnect 128. The first I/O controller 108 may forward the response to the I/O controller 108 via the interface 130. The I/O controller 108 may send the response for the transaction to the host processor 104.

As discussed above with reference to FIG. 1, typically, access to the SoC resources (e.g., memories, attached peripherals, local peripherals) by the host system 102 may be indirect because the transaction requests may get processed by the processor 118 on the SoC 110 which can proxy the requests from the host processor 104. These indirect accesses may result in additional processing and higher latency than if the peripherals were directly attached to the host system 102 or directly accessible by the host system 102.

Various embodiments of the disclosed technologies can allow direct communication between the host system 102 and one or more resources for the SoC 110 by directly mapping the one or more resources of the SoC 110 to the host system 102 as peripheral bus functions. In various embodiments of the disclosed technologies, a translation unit can provide the necessary translation between a host system address space and an SoC address space allowing direct exposure of the SoC resources to the host system (via functions), as will be described below with reference to FIGS. 2-6. It will be understood that other implementations are possible in place of or in addition to the translation unit for providing the host system with a direct interface to the SoC resources.

Figure 2:
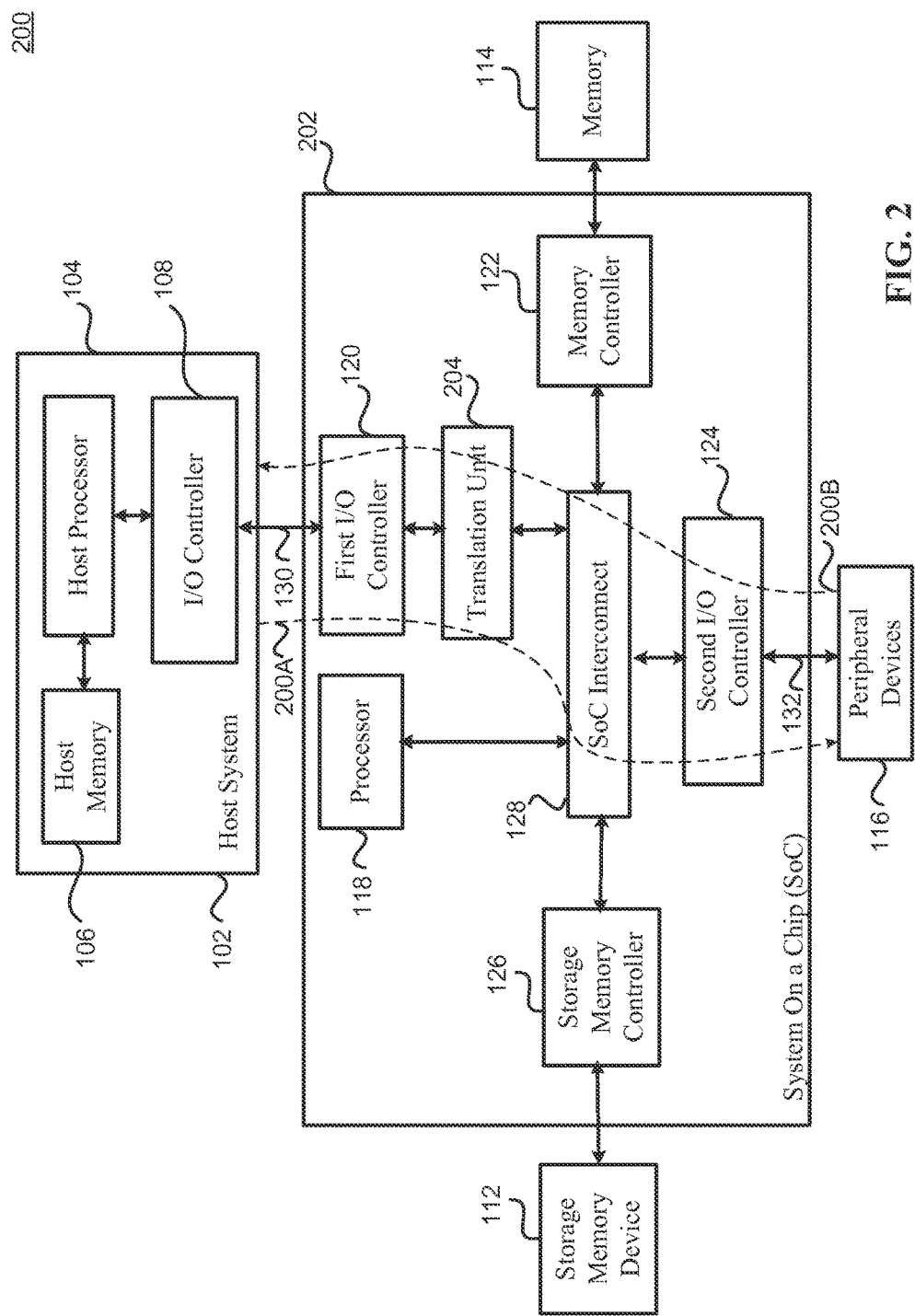
FIG. 2 illustrates a system for processing I/O transactions using a translation unit, according to some embodiments of the disclosed technology.

FIG. 2 illustrates a system 200 for processing I/O transactions using a translation unit, according to some embodiments of the disclosed technology.

The system 200 may include the host system 102 communicatively coupled to an SoC 202 via the interface 130. The SoC 202 may include a translation unit 204 in addition to the processor 118, first I/O controller 120, memory controller 122, second I/O controller 124, storage memory controller 126 and the SoC interconnect 128 as discussed with reference to FIG. 1. The SoC 202 may also be coupled to the storage memory device 112, memory 114 and the peripheral devices 116. In some embodiments, one or more components associated with the SoC 202 (e.g., processor 118, first I/O controller 120, translation unit 204, SoC interconnect 128, second I/O controller 124, etc.) may be implemented as discrete components instead of a system on a chip. Further, in some embodiments, the SoC 202 may include one or more on-chip resources (e.g., memories, peripherals) and one or more interfaces for one or more off-chip resources (e.g., memories, peripherals) that may be coupled to the SoC 202. In some embodiments, a SoC may include one or more compute subsystems and an interconnect fabric (e.g., the SoC interconnect 128) that may be configured to connect with the one or more compute subsystems and the one or more on-chip resources, as will be discussed later with reference to FIG. 8.

Figure 7A:
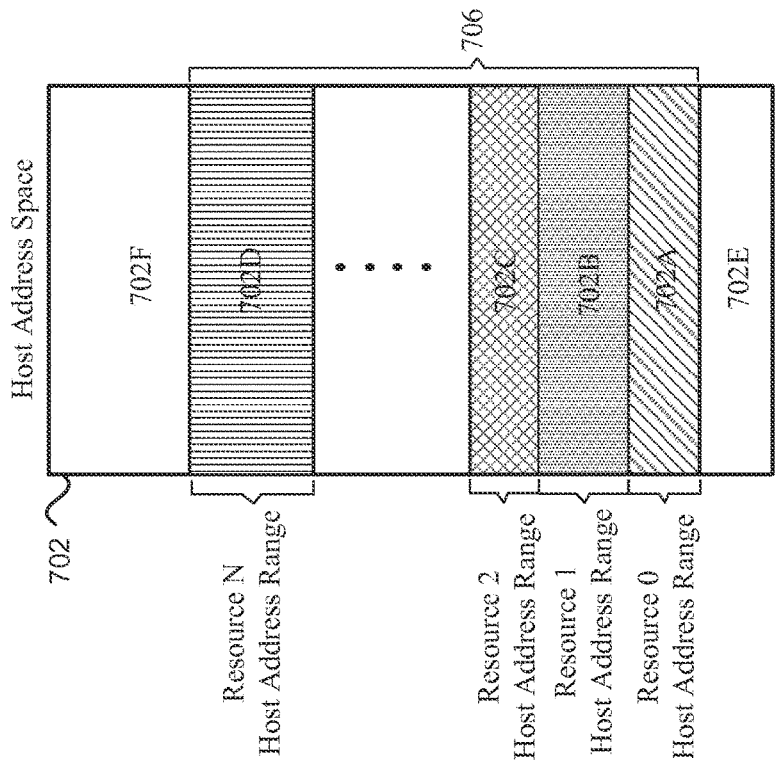
FIG. 7A illustrates an exemplary memory map for the host address space, according to one embodiment of the disclosed technology.
Figure 7B:
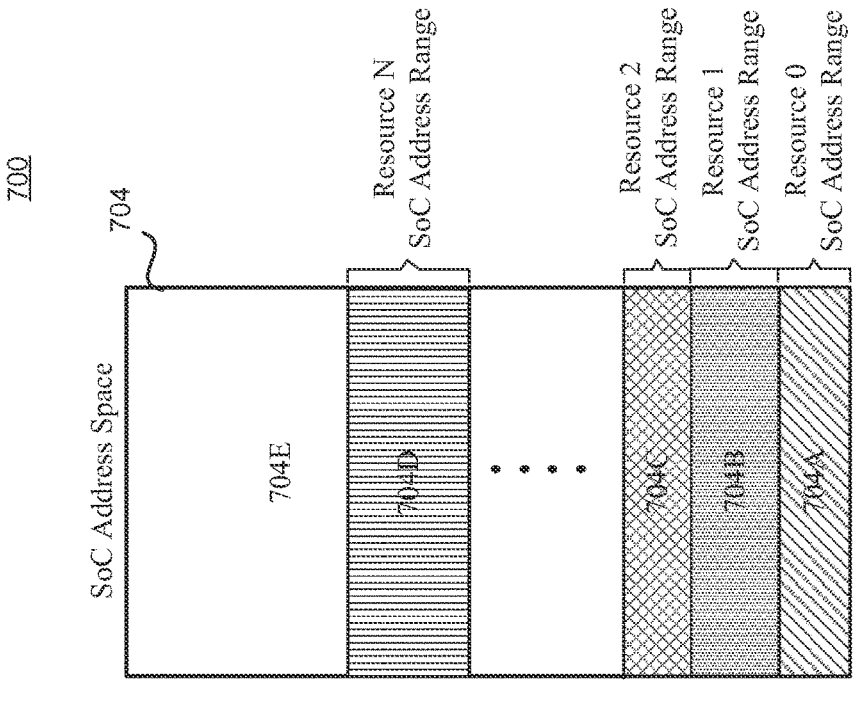
FIG. 7B illustrates an exemplary memory map for the SoC address space, according to one embodiment of the disclosed technology.

In various embodiments of the disclosed technologies, the one or more resources for the SoC 202 may be memory mapped to an SoC address space in the SoC 202. FIG. 7B illustrates an exemplary memory map for the SoC address space. In some implementations, the one or more SoC resources may include resources on the SoC 202 (e.g., local resources or on-chip resources) and resources coupled to the SoC 202 (e.g., attached resources or off-chip resources). For example, the resources on the SoC 202 may include memory and peripherals, e.g., the storage memory controller 126 and the memory controller 122. It will be understood that in some implementations, the storage memory controller 126 may be integrated with the storage memory device 112 and the memory controller 122 may be integrated with the memory 114. The resources coupled to the SoC 202 may include the peripheral devices 116. The peripheral devices 116 may include network devices, USB devices, audio devices, storage devices, etc. It will be understood that in different embodiments of the disclosed technologies, the one or more resources of the SoC 202 (e.g., the storage memory controller 126, memory controller 122, memory 114 or the peripheral devices 116) may be on the SoC 202 or attached to the SoC 202. For example, in one embodiment, the memory 114 and one or more peripheral devices from the peripheral devices 116 may be on the SoC 202.

In various embodiments of the disclosed technologies, the one or more resources for the SoC 202 can be mapped to the host system 102. FIG. 7A illustrates an exemplary memory map for the host address space. According to some embodiments of the technology, the SoC 202 can present itself as a multi-function I/O device to the host system 102. For example, the one or more resources for the SoC 202 may be memory mapped to one or more host address spaces in the host system 102. For example, the one or more host address spaces may include configuration space and memory mapped I/O space. In some embodiments, the one or more resources for the SoC 202 can be directly mapped as peripheral bus functions to the host system 102. For example, in some implementations, the one or more resources for the SoC 202 can be directly mapped as PCIe functions, wherein each resource from the one or more resources may correspond to one physical function and one or more virtual functions. In some implementations, the one or more resources attached to a PCIe bus (e.g., peripheral devices 116) can be directly mapped to the host system 102 and the one or more resources local to the SoC 202 (e.g., storage memory controller 126, memory controller 122, etc.)

may be mapped as emulated PCIe devices (e.g., software emulated) to the host system 102. For example, in some implementations, the SoC 202 may implement configuration space for the emulated PCIe devices in order to implement a PCIe function. For example, in some embodiments, the first I/O controller 120 may be configured as a PCIe end point device to allow the configuration cycles to pass through the first I/O controller 120 to the SoC 202. In some embodiments, the first I/O controller 120 may be configured to support PCIe parameters such as requester identifier (ID) to implement the PCIe functionality.

Referring back to FIG. 2, the host address space may correspond to an address space in the host memory 106. In some implementations, the address space supported by a processor may be much larger than the actual physical memory in the system. For example, in some implementations, the host address space may be a virtual address space that is mapped to a physical address space in the host memory 106. In some implementations, the host memory 106 may be system memory that can also include program memory, data memory, etc. For example, a first address range in the host memory 106 may correspond to the memory mapped I/O resources, a second address range in the host memory 106 may correspond to the program memory and a third address range in the host memory 106 may correspond to the data memory. The host memory 106 may be internal or external to the host system 102. In some implementations, the host memory 106 may be implemented as a DRAM, DDR SDRAM, DDR2 SDRAM or any other suitable implementation.

FIG. 7A illustrates an exemplary memory map 702 for the host address space. The memory map 702 may correspond to an address space supported by the host system 102 using the host memory 106. In certain implementations, the address space depicted in FIG. 7A is a linear or virtual address space that is mapped to the physical address space using a paging table maintained by the host processor 104. In some implementations, the one or more resources for the SoC 202 can be directly mapped as peripheral bus functions in a host address range 706. A resource 0 may be mapped to a host address range 702A, a resource 1 may be mapped to a host address range 702B, a resource 2 may be mapped to a host address range 702C and a resource N may be mapped to a host address range 702D. For example, a transaction targeted for a resource may include an address that may correspond to the host address range in the host address space for that resource. In some implementations, the address may be logical or a virtual address. For example, in some implementations, the resource 0 may be a resource on the SoC 202, e.g., the storage memory controller 126. The resource 1 may be a resource attached to the SoC 202, e.g., a first peripheral device from the peripheral devices 116. In some implementations, a host address range 702E may correspond to a program memory and a host address range 702F may correspond to a data memory for the host system 102.

In some embodiments, the SoC 202 may be configured to implement PCI compliant configuration space and memory mapped IO (MMIO) space to form a PCIe function for each resource. For example, in some implementations, configuration space for each resource from the one or more resources for the SoC 202 can include a set of configuration registers. The configuration registers can be accessed by performing reads and writes to a specific memory range in the host address space. In some implementations, the specific memory range may also include the configuration register base address register (BAR). In some embodiments, BIOS (Basic Input Output System) can program the configuration space to occupy memory address space in the host memory 106 based on the number of PCIe buses, PCIe devices, functions and configuration registers for the SoC 202. For example, the BIOS may be a system BIOS that can be used to power up the SoC 202.

Referring back to FIG. 2, in some embodiments, the direct mapping implementation may vary based on the type of resource being mapped. For example, in some implementations, the SoC 202 can implement configuration space for local I/O resources, e.g., the resources that are not coupled to the PCIe bus, e.g., the memory controller 122 (memory 114) and the storage memory controller 126 (storage memory device 112), in the host address space to present the local I/O resources as emulated PCIe devices to the host system 102. The configuration space may or may not be directly mapped to the host memory address space. Address translation between the host address space and the SoC address space can be performed to facilitate the transactions with the local I/O resources using the host address space.

In some embodiments, the SoC 202 can directly map the PCIe attached devices (e.g., peripheral devices 116) to the host address space (e.g., both configuration and MMIO address space). Address translation between the host address space (for both configuration and MMIO address space) and the SoC address space can be performed to facilitate the transactions with the PCIe attached devices using the host address space. Thus mapping the SoC resources as PCIe functions to the host address space may expose the SoC resources to the host system 102. Therefore, the host system 102 can directly communicate with the SoC resources using the host address space for I/O transactions bypassing the processor 118. Thus, some embodiments of the technology can provide the ability to pass-through a PCIe attached device as one or more PCIe functions to the host system 102.

FIG. 7B illustrates an exemplary memory map 704 for the SoC address space. In some implementations, the memory map 704 may correspond to an address space in the memory 114. In certain implementations, the address space depicted in FIG. 7B is a linear or virtual address space that is mapped to the physical address space using a paging table maintained by the processor 118. In different embodiments of the disclosed technology, the host address space and the SoC address space may correspond to different memory regions in their respective memories. A resource 0 may be mapped to an SoC address range 704A, a resource 1 may be mapped to an SoC address range 702B, a resource 2 may be mapped to an SoC address range 702C and a resource N may be mapped to an SoC address range 702D. For example, for a transaction targeted for an SoC resource, the translation unit may translate an address from the corresponding host address range in the host address space to a target SoC address from the corresponding SoC address range in the SoC address space for that resource. For example, in some implementations, the resource 0 may be the storage memory controller 126. The resource 1 may be the memory controller 122. The resource 2 may be a first peripheral from the peripheral devices 116. In some implementations, the memory 114 may also include program and/or data memory, e.g., mapped to a memory range 704E.

In some embodiments, a SoC resource may initiate a transaction with an SoC address that may be targeted for the host system 102 or for another SoC resource. The SoC address for the transaction may belong to a certain SoC address range that may be mapped to a host address space. In some implementations, an SoC address range may represent a large contiguous area of SoC addresses that can be mapped to the host system 102. In some embodiments, one or more upper address bits of a SoC address belonging to that SoC address range may correspond to the host system 102 as the target destination and the remaining bits of that SoC address may be mapped to the one or more host address spaces. For example, the transaction may be targeted for resource 2 and therefore the SoC address for the transaction may belong to a SoC address range that may be mapped to the resource 2 host address range 702C, as shown in FIG. 7A. The translation unit 204 may translate the SoC address to a host address in the resource 2 host address range 702C by dropping the one or more upper address bits. The translation unit 204 may detect that the host address is mapped to resource 2 for the SoC. The translation unit 204 may further translate the translated host address to a target SoC address (e.g., resource 2 SoC address range 704C) using the mapping of the peripheral bus function.

Referring back to FIG. 2, in various embodiments of the disclosed technologies, the translation unit 204 may be configured to provide necessary translation of addresses from the host address space to the SoC address space or from the SoC address space to the host address space for transactions targeted for the one or more resource for the SoC 202. In some embodiments, the translation unit 204 may be configured to translate an address for a transaction targeted for a local I/O resource (e.g., storage memory controller 126) from the one or more resources belonging to the host address space to a target SoC address belonging to the SoC address space to facilitate performing of the transaction with the local I/O resource using the host address space. For example, the transaction may correspond to a request to access the local I/O resource for writing or reading a resource register.

In some embodiments, a transaction may be initiated by the host system 102 to access a PCIe attached resource from the one or more resources. For example, the transaction may correspond to a request to access a peripheral device (e.g., a network card) from the peripheral devices 116 by the host system 102 using the host address space. In some embodiments, a transaction may be initiated by a PCIe attached resource from the one or more resources that may be targeted for the host system 102. In some embodiments, a second transaction may be initiated by the PCIe attached resource in response to a first transaction that may be initiated by the host system 102.

In some embodiments, a first transaction may be initiated by a first peripheral device to access a second peripheral device from the peripheral devices 116. In some embodiments, a second transaction may be initiated by the second peripheral device in response to the first transaction. For example, the second transaction may be initiated by the first peripheral device to respond to the second peripheral device for the first transaction.

A process flow for processing I/O transactions using the system 200 according to some embodiments of the disclosed technology is described below.

At step 200A, the host system 102 may initiate a transaction targeted for a first peripheral device from the peripheral devices 116. In some implementations, the first peripheral device may be mapped to a configuration space and memory mapped I/O space in the host address space. For example, as discussed with reference to FIG. 7A, the first peripheral device may be mapped to the resource 2 host address range 702C in the host address space, as shown in the host memory map 702. In some embodiments, the I/O controller 108 may generate a transaction request on behalf of the host processor 104. For example, in some implementations, the I/O controller 108 may be configured as a PCIe controller that may be configured in the root complex mode. According to some embodiments, the I/O controller 108 may generate an I/O transaction targeted for the first peripheral device using an address mapped in the host address space. The translation unit 204 may translate the address belonging to the host address space to a target SoC address belonging to the SoC address space. For example, referring back to FIG. 7B, the translation unit 204 may translate the address belonging to the host address range 702C to a corresponding address within the SoC address range 704C. In some implementations, translation of the address may be based on the mapping of the resources as the peripheral bus functions in the host address space. The translation unit 204 may send the I/O transaction with the target SoC address mapped to the SoC address space to the second I/O controller 124 via the SoC interconnect 128. The second I/O controller 124 may access the first peripheral device using the target SoC address via the interface 132. For example, the I/O transaction may involve writing to the first peripheral device in the peripheral devices 116 or reading from the first peripheral device.

At step 200B, the first peripheral device may initiate a second transaction with an address belonging to the SoC address space. In some embodiments, the SoC address for the second transaction may be direct mapped to the host address space. For example, in some implementations, one or more upper bits of the address for the transaction may identify the address in a certain SoC address range that may be direct mapped to the host address space. The second I/O controller 124 may forward the transaction to the translation unit 204 for translating the address to an address belonging to the target address space. The translation unit 204 may decode the address for the transaction to determine the target address for the transaction. In some implementations, the translation unit 204 may determine that the transaction is targeted for the host system 102 based on one or more upper bits (e.g., four or less) of the address for the transaction. The translation unit 204 may drop the one or more upper bits of the address and determine a target host address based on the remaining bits of the address that may be mapped to the host address space. The translation unit 204 may send the second transaction with the target host address mapped to the host address space to the first I/O controller 120. The first I/O controller 120 can forward the second transaction to the I/O controller 108 via the interface 130. Thus, embodiments of the disclosed technology can allow performing I/O transactions with the SoC resources for a host system without communicating with the processor 118. This may provide low latency high performance communication with the SoC resources.

Figure 3:
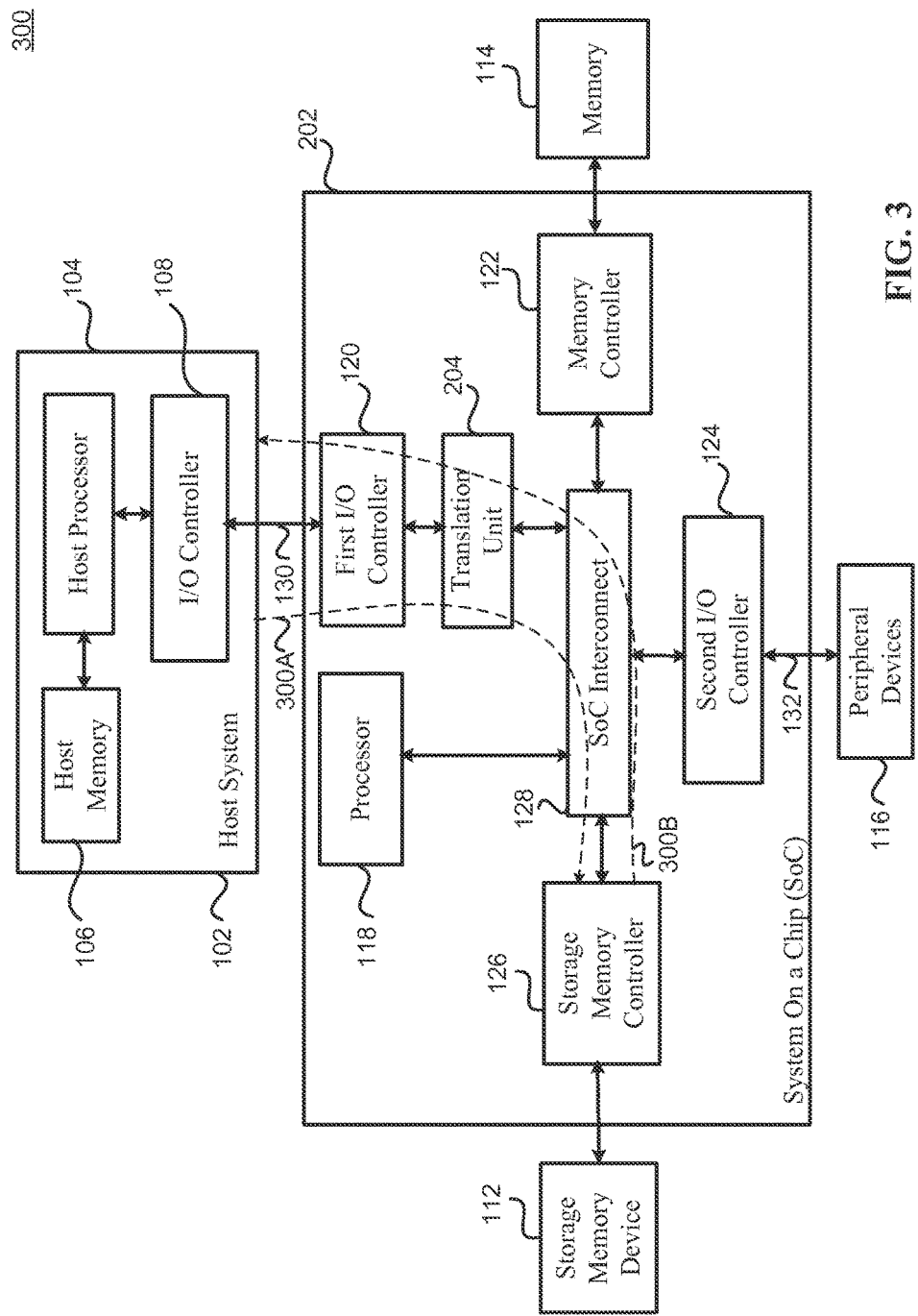
FIG. 3 illustrates a system for processing I/O transactions between a host system and a resource on the SoC using a translation unit, according to some embodiments of the disclosed technology.

FIG. 3 illustrates a system 300 for processing I/O transactions between the host system and the resources on the SoC using the translation unit, according to some embodiments of the disclosed technology. In some embodiments, the resources on the SoC may include one or more on-chip peripherals and/or memories.

The system 300 illustrates a process flow for a transaction between the host system 102 and the storage memory controller 126 according to certain embodiments of the disclosed technology. The storage memory controller 126 may be coupled to the storage memory device 112 that may be external or internal to the SoC 202. For example, in some implementations, the storage memory controller 126 can be a SATA controller and the storage memory device 112 can be a hard disc drive. In some embodiments, the storage memory controller 126 may be integrated with the storage memory device 112, such as a SATA hard drive.

In some embodiments of the disclosed technology, the storage memory controller 126 may be mapped to the host address space in the host system 102 and to the SoC address space in the SoC 202. For example, as discussed previously with reference to FIGS. 7A and 7B, in some implementations, the storage memory controller 126 may be mapped to the resource 1 host address range 702B in the host address space and to the resource 1 SoC address range 704B in the SoC address space.

In some embodiments, the storage memory controller 126 can be mapped as a peripheral bus function in the host address space in the host system 102. For example, in some implementations, the SoC 202 may present the storage memory controller 126 as an emulated PCIe device to the host system 102 by implementing configuration space for the storage memory controller 126. Referring back to FIG. 7A, in some implementations, the resource 1 host address range 702B in the host address space may include configuration registers range for the storage memory controller 126. Address translation between the host address space and the SoC address space can be performed to facilitate the transactions with the local I/O resources using the host address space.

At step 300A, the host system 102 can initiate a first transaction targeted for the storage memory controller 126, e.g., to access the storage memory device 112. In some embodiments, the I/O controller 108 may initiate a first transaction on behalf of the host processor 104. For example, the first transaction may be targeted for the storage memory controller 126 using an address belonging to the host address space. The I/O controller 108 may forward the first transaction to the first I/O controller 120 via the interface 130. The first I/O controller 120 may forward the first transaction to the translation unit 204 for translating the address for the transaction to a target address space. The translation unit 204 may decode the address for the first transaction and may determine that the first transaction is targeted for the storage memory controller 126. The translation unit 204 may further determine that the address for the first transaction corresponds to the host address space. For example, the storage memory controller 126 may be mapped as a peripheral bus function in the host address space. The translation unit 204 may translate the address for the first transaction belonging to the host address space to a target SoC address belonging to the SoC address space to facilitate performing the first transaction with the storage memory controller 126 using the host address space. The translation unit 204 may send the first transaction to the storage memory controller 126 at the address from the SoC address space via the SoC interconnect 128. The storage memory controller 126 may perform the first transaction, e.g., write data to the storage memory device 112 or read data from the storage memory device 112.

At step 300B, the storage memory controller 126 may initiate a second transaction with an address belonging to the SoC address space targeted for the host system 102. The storage memory controller 126 may send the second transaction to the translation unit 204 via the SoC interconnect 128. For example, the second transaction may be a response to the first transaction, e.g., data read from the storage memory device 112. The translation unit 204 may decode the address for the second transaction and may determine that the transaction is targeted for the host system 102. In some implementations, the translation unit 204 may determine that the transaction is targeted for the host system 102 based on one or more upper bits of the address for the second transaction. The translation unit 204 may drop the one or more upper bits of the address and determine a target host address based on the remaining bits of the address that may be mapped to the host address space. The translation unit 204 may translate the address for the second transaction to the target host address belonging to the host address space to facilitate performing the second transaction with the host system 102 using the SoC address space that is mapped to the host address space. The translation unit 204 may send the second transaction at the address belonging to the host address space to the first I/O controller 120. The first I/O controller 120 may forward the second transaction to the I/O controller 108 via the interface 130. The I/O controller 108 may process the second transaction on behalf of the host processor 104.

Thus, embodiments of the disclosed technology can allow I/O transactions with the resources on the SoC 202 without communicating with the processor 118, thus providing low latency high performance communication with the SoC resources. Although, FIG. 3 shows communication with the storage memory controller 126, it will be understood that the aspects of the technology can be used for communication with other resources on the SoC 202, e.g., the memory controller 122 (memory 114).

Figure 4:
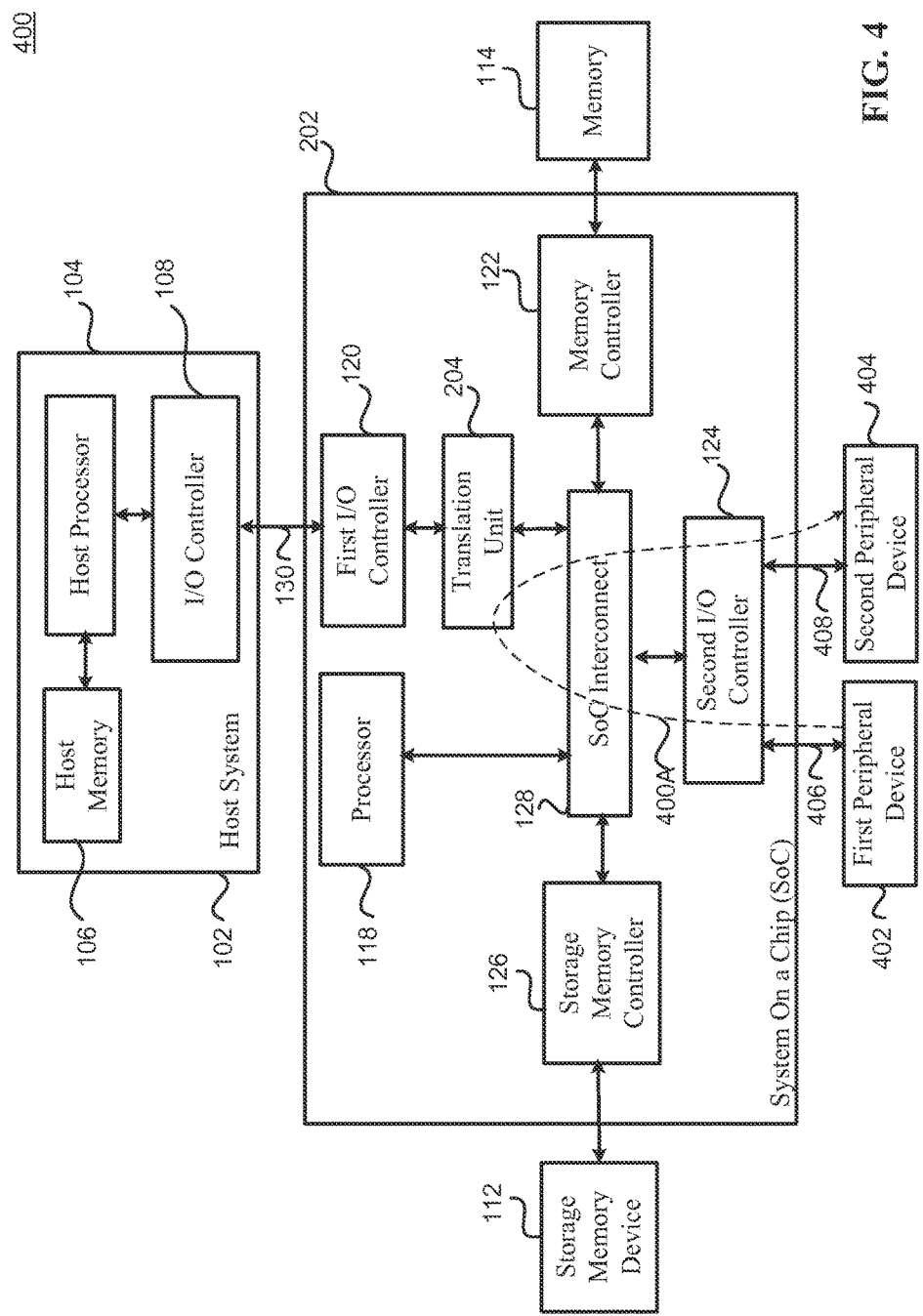
FIG. 4 illustrates a system for processing I/O transactions between two peripheral devices coupled to the SoC using a translation unit, according to some embodiments of the disclosed technology.

FIG. 4 illustrates a system 400 for processing peer-to-peer transaction between two peripheral devices using the translation unit, according to some embodiments of the disclosed technology. In some embodiments, the peripheral devices can be coupled to the SoC using a PCIe interface.

The system 400 illustrates a process flow for a transaction between a first peripheral device 402 and a second peripheral device 404 according to certain embodiments of the disclosed technology. The first peripheral device 402 and the second peripheral device 404 may be the peripheral devices 116, as discussed previously with reference to FIGS. 2 and 3. For example, the first peripheral device 402 may be a network interface controller and the second peripheral device 404 may be a USB device.

In some embodiments of the disclosed technology, each of the first peripheral device 402 and the second peripheral device 404 may be mapped to a host address space in the host system 102 and to an SoC address space in the SoC 202. For example, as discussed previously with reference to FIGS. 7A and 7B, in some implementations, the first peripheral device 402 may be mapped to the resource 0 host address range 702A in the host address space and to the resource 0 SoC address range 704A in the SoC address space. Similarly, in some implementations, the second peripheral device 404 may be mapped to the resource 1 host address range 702B in the host address space and to the resource 1 SoC address range 704B in the SoC address space.

In some embodiments, the first peripheral device 402 and the second peripheral device 404 can be mapped as peripheral bus functions in the host address space in the host system 102. For example, in some implementations, the configuration space and the MMIO address space for each of the first peripheral device 402 and the second peripheral device 404 may be mapped to the host address space. The translation unit can provide the necessary translation between the host address space and the SoC address space for communication between the two peripheral devices for an I/O transaction, without any communication with the host system 102.

In step 400A, the first peripheral device 402 may initiate a first transaction with the second peripheral device 404. For example, the first peripheral device 402 can initiate a first transaction targeted for the second peripheral device 404 using an SoC address belonging to an SoC address range that may be direct mapped to the host address space. For example, referring back to FIG. 7A, if the first transaction is targeted for resource 1 (second peripheral device 404), the address for the transaction may belong to an SoC address range that may be direct mapped to the resource 1 host address range 702B. The first peripheral device 402 may send the transaction to the second I/O controller 124 using an interface 406. For example, the interface 406 may be a PCIe interface. The second I/O controller 124 may forward the first transaction to the translation unit 204. The translation unit 204 may decode the address for the first transaction and may determine that the address targets the second peripheral device 404. The translation unit 204 may translate the address for the first transaction belonging to the host address space to a target SoC address belonging to the SoC address space. For example, referring back to FIGS. 7A and 7B, the translation unit may translate the address belonging to the resource 1 host address range 702B to the target SoC address belonging to the resource 1 SoC address range 704B based on the mapping of the peripheral bus function. The translation unit 204 may send the first transaction using the target SoC address belonging to the SoC address space to the second I/O controller 124. The second I/O controller 124 may forward the first transaction to the second peripheral device 404 using an interface 408. For example, the interface 408 may be a PCIe interface. The second peripheral device 404 may perform the first transaction. In some embodiments, the second peripheral device 404 may initiate a second transaction targeted for the first peripheral device 402. For example, the second transaction may be in response to the first transaction. It will be understood that the communication between the second peripheral device 404 and the first peripheral device 402 may follow the same process flow as discussed above.

Figure 5:
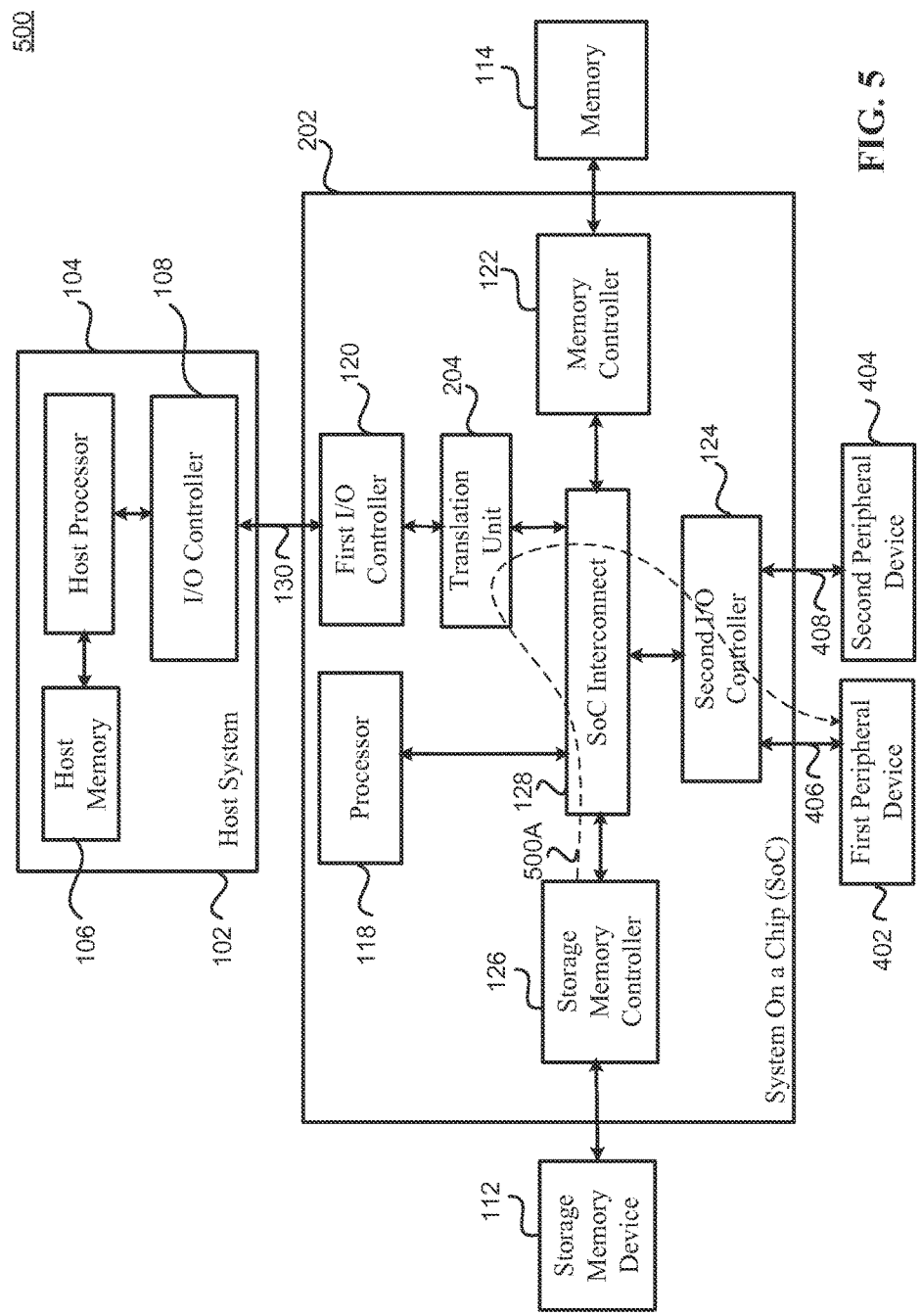
FIG. 5 illustrates a system for processing I/O transactions between a first resource on the SoC and a second resource coupled to the SoC using a translation unit, according to some embodiments of the disclosed technology.

FIG. 5 illustrates a system 500 for processing I/O transactions between a first resource on the SoC and a second resource coupled to the SoC using a translation unit, according to some embodiments of the disclosed technology. In some embodiments, the first resource can be on the SoC (e.g., storage memory controller 126) and the second resource can be coupled to the SoC (e.g., first peripheral device 402).

The system 500 illustrates a process flow for a transaction between the storage memory controller 126 and the first peripheral device 402 according to certain embodiments of the disclosed technology. For example, the first peripheral device 402 may be a network interface controller.

In some embodiments of the disclosed technology, each of the storage memory controller 126 and the first peripheral device 402 may be mapped to a host address space in the host system 102 and to an SoC address space in the SoC 202. For example, as discussed previously with reference to FIGS. 7A and 7B, in some implementations, the first peripheral device 402 may be mapped to the resource 0 host address range 702A in the host address space and to the resource 0 SoC address range 704A in the SoC address space. Similarly, in some implementations, the storage memory controller 126 may be mapped to the resource 2 host address range 702C in the host address space and to the resource 2 SoC address range 704C in the SoC address space.

In some embodiments, the storage memory controller 126 and the first peripheral device 402 can be mapped as peripheral bus functions in the host address space in the host system 102. For example, in some implementations, the configuration space and the MMIO address space for the first peripheral device 402 may be mapped to the host address space. Similarly, in some implementations, the configuration space for the storage memory controller 126 may be mapped to the host address space. For example, in some implementations, the storage memory controller 126 may be presented as an emulated PCIe device to the host system 102. The translation unit can provide the necessary translation between the host address space and the SoC address space for communication between the storage memory controller 126 and the first peripheral device 402 without any communication with the host system 102.

In step 500A, the storage memory controller 126 may initiate a first transaction with the first peripheral device 402. For example, the storage memory controller 126 can initiate a first transaction targeted for the first peripheral device 402 using an SoC address that may be direct mapped to the host address space. For example, referring back to FIG. 7A, the address for the transaction may belong to an SoC address range that may be direct mapped to the resource 0 host address range 702A for the first peripheral device 402. The storage memory controller 126 may send the first transaction to the second I/O controller 124 via the SoC interconnect 128. The second I/O controller 124 may forward the first transaction to the translation unit 204. The translation unit 204 may detect that the host address targets a resource mapped to the SoC address range. For example, the translation unit 204 may decode the address for the first transaction and may determine that the address targets the first peripheral device 402. In some implementations, the translation unit 204 may determine that the address for the first transaction belongs to the first peripheral device 402 based on one or more upper bits of the address. For example, the one or more upper bits of the address may identify that the address corresponds to an SoC address range that may be direct mapped to the host address space. The translation unit 204 may translate the address for the first transaction belonging to the host address space to a target SoC address belonging to the SoC address space. Referring back to FIGS. 7A and 7B, the translation unit 204 may translate the address belonging to the resource 0 host address range 702A to the target SoC address belonging to the resource 0 SoC address range 704A based on the mapping of the peripheral bus function. The translation unit 204 may send the first transaction using the target SoC address belonging to the SoC address space to the second I/O controller 124. The second I/O controller 124 may forward the first transaction to the first peripheral device 402 using the interface 406. For example, the interface 406 may be a PCIe interface. The first peripheral device 402 may perform the first transaction. In some embodiments, the first peripheral device 402 may initiate a second transaction targeted for the storage memory controller 126. For example, the second transaction may be in response to the first transaction. It will be understood that the communication between the first peripheral device 402 and the storage memory controller 126 may follow the same process flow as discussed above.

Figure 6:
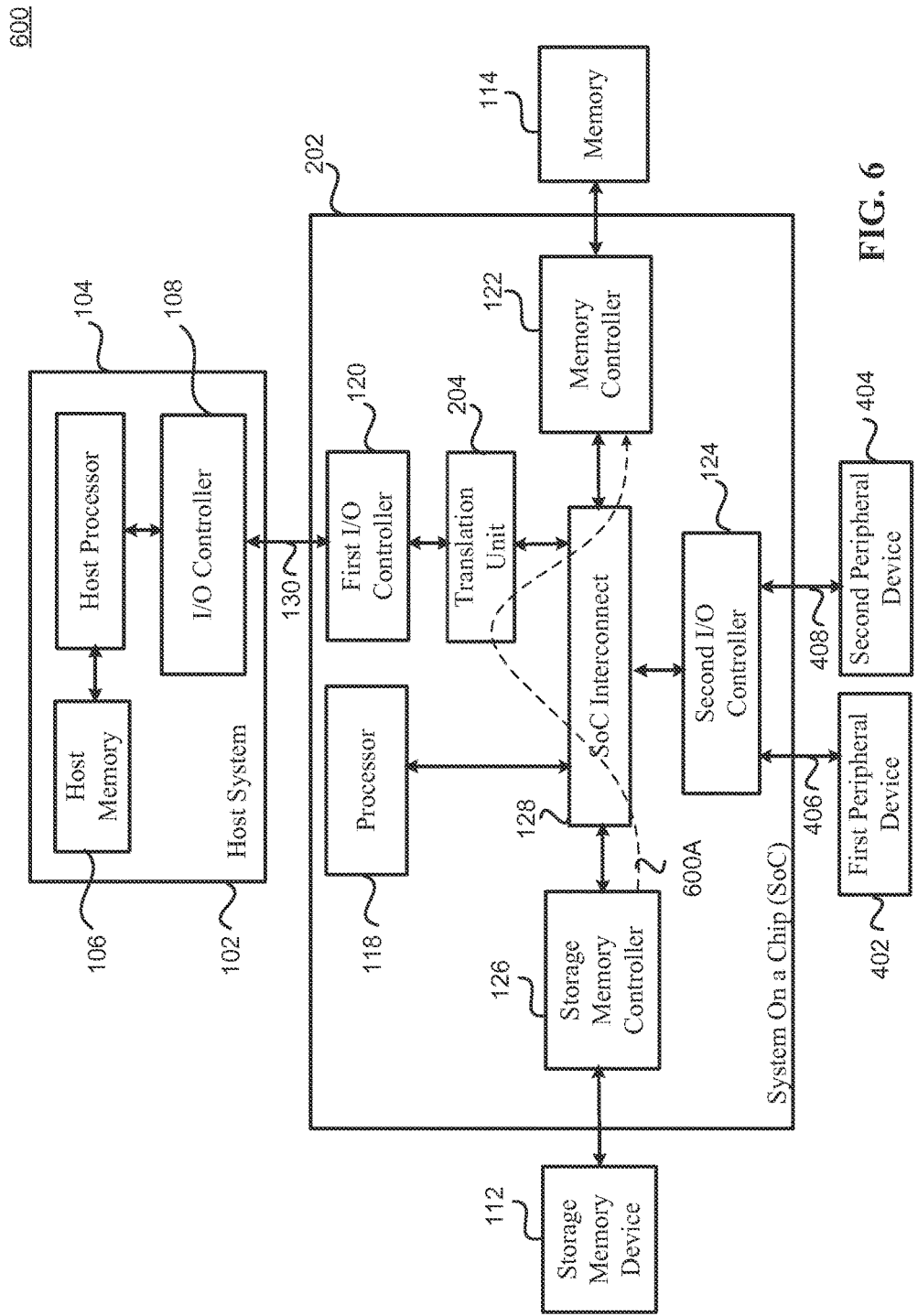
FIG. 6 illustrates a system for processing I/O transactions between a first resource on the SoC and a second resource on the SoC using a translation unit, according to some embodiments of the disclosed technology.

FIG. 6 illustrates a system 600 for processing I/O transactions between a first resource on the SoC and a second resource on the SoC using the translation unit, according to some embodiments of the disclosed technology. In some embodiments, the first resource can be a storage memory device (e.g., SATA drive) and the second resource can be a memory (e.g., DRAM). It will be understood that in some implementations, communication between the storage memory device and the memory may be performed through the storage memory controller and the memory controller respectively.

The system 600 illustrates a process flow for a transaction between the storage memory controller 126 and the memory controller 122 according to certain embodiments of the disclosed technology.

In some embodiments of the disclosed technology, each of the storage memory controller 126 and the memory controller 122 may be mapped to a host address space in the host system 102 and to an SoC address space in the SoC 202. For example, as discussed previously with reference to FIGS. 7A and 7B, in some implementations, the memory controller 122 may be mapped to the resource 1 host address range 702B in the host address space and to the resource 1 SoC address range 704B in the SoC address space. Similarly, in some implementations, the storage memory controller 126 may be mapped to the resource 2 host address range 702C in the host address space and to the resource 2 SoC address range 704C in the SoC address space.

In some embodiments, the storage memory controller 126 and the memory controller 122 can be mapped as peripheral bus functions in the host address space in the host system 102. For example, in some implementations, the configuration space for the storage memory controller 126 and the configuration space for the memory controller 122 may be mapped to the host address space. This may allow presenting the storage memory controller 126 and the memory controller 122 as emulated devices mapped to the host system 102. The translation unit can provide the necessary translation between the host address space and the SoC address space for communication between the storage memory controller 126 and the memory controller 122 without any communication with the host system 102. Thus some embodiments of the technology can allow peer-to-peer capability between the emulated devices using the translation unit.

In step 600A, the storage memory controller 126 may initiate a first transaction with the memory controller 122. For example, the storage memory controller 126 can initiate a first transaction targeted for the memory controller 122 using an SoC address that may be direct mapped to the host address space. The storage memory controller 126 may send the first transaction to the translation unit 204 via the SoC interconnect 128. The translation unit 204 may decode the address for the first transaction and may determine that the address targets the memory controller 122. The translation unit 204 may translate the address for the first transaction belonging to the host address space to an SoC target address belonging to the SoC address space. The translation unit 204 may send the first transaction at the SoC target address from the SoC address space to the memory controller 122. The memory controller 122 may access the memory 114 to perform the first transaction. For example, the memory controller 122 may write to the memory 114 or read from the memory 114. In some embodiments, the memory controller 122 may initiate a second transaction targeted for the storage memory controller 126. For example, the second transaction may be in response to the first transaction. It will be understood that the communication between the memory controller 122 and the storage memory controller 126 may follow the same process flow as discussed above.

As discussed above with reference to FIGS. 4, 5 and 6, various embodiments of the disclosed technologies can allow peer-to-peer communication between different resources (including PCIe attached devices and emulated PCIe devices) for the SoC 202. This can allow low latency I/O transactions without any communication with the host system 102 or the processor 118.

Figure 8:
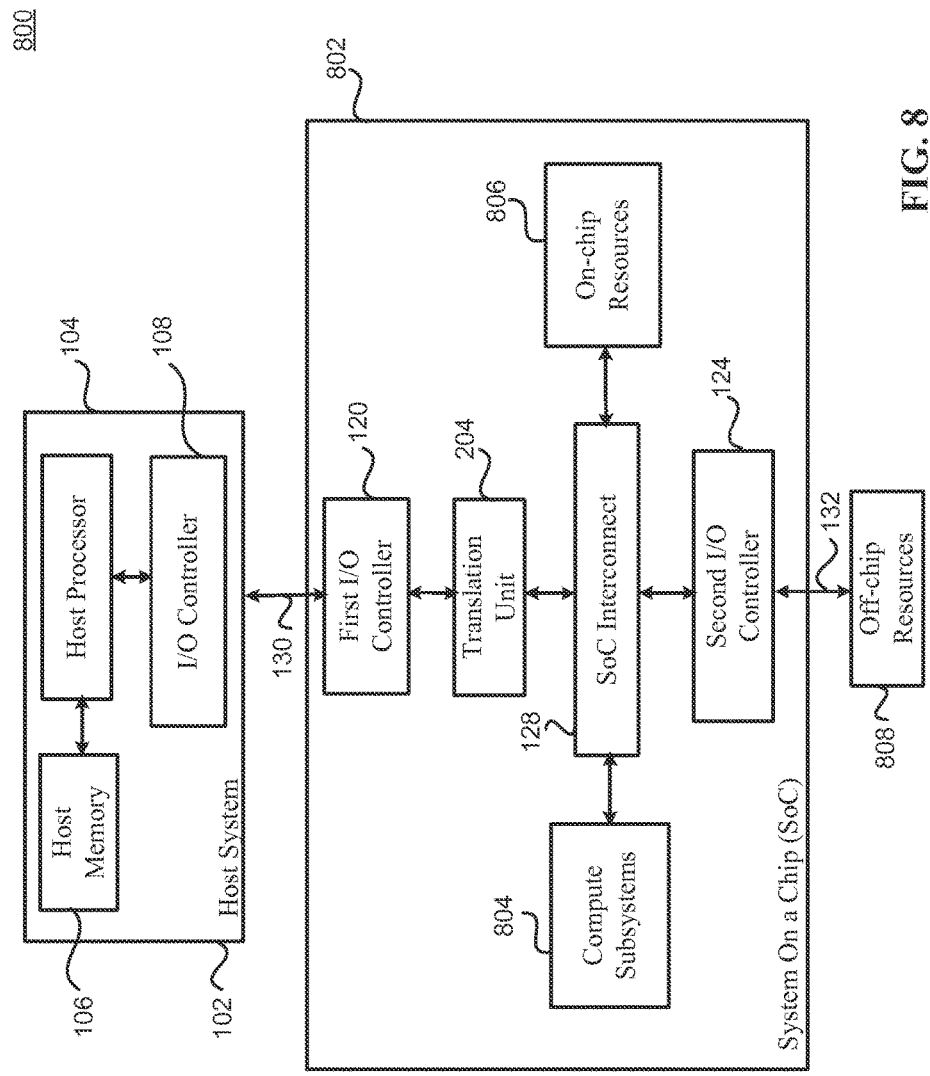
FIG. 8 illustrates a system for processing I/O transactions, according to one embodiment of the disclosed technology.

FIG. 8 illustrates a system 800 for performing I/O transactions, according to some embodiments of the disclosed technology. In some embodiments, a SoC can include one or more compute subsystems and an SoC interconnect that may be configured to connect with the one or more compute subsystems and the one or more resources for the SoC.

The system 800 may include a SoC 802 that may be configured to communicate with the host system 102 using the interface 130. The SoC 802 may include compute subsystems 804 and on-chip resources 806 in addition to the first I/O controller 120, translation unit 204, SoC interconnect 128 and the second I/O controller 124, as discussed with reference to FIGS. 2-6. In addition, the SoC 802 may be coupled to off-chip resources 808 via the interface 132.

The compute subsystems 804 may include one or more processing resources. For example, the one or more processing resources may include multi-core processors (e.g., ARM's cortex A57, MIPS, AMD Phenom, Intel ATOM, etc.), caches (e.g., Level 1 (L1) and Level 2 (L2), caches), etc. In some embodiments, the SoC 802 may be configured to offload some of the functionalities of the host system 102 using the compute subsystems 804. In some implementations, the compute subsystems 804 may include one or more compute subsystems to provide various services such as compute services, network services, etc. For example, the compute services may include providing virtual or physical resources to client computers, e.g., by launching virtual machine instances of various sizes, associating storage volumes to the virtual machines on demand, providing client computers with resources to run applications by renting virtual machines, data processing, storage, etc. The network services may include network related functionalities such as network traffic shaping, network acceleration, network storage processing, etc. In some implementations, the processor 118, as discussed with reference to FIGS. 2-6 for the SoC 202, may be part of the compute subsystems 804.

The on-chip resources 806 may include local resources for the SoC 802, e.g., the storage memory controller 126 and the memory controller 122 (memory 114). The off-chip resources 808 may include the peripheral devices 116, e.g., the first peripheral device 402 and the second peripheral device 404. In some embodiments, the SoC interconnect 128 may be implemented as a coherent fabric that may be configured to connect various components of the SoC 802, e.g., the compute subsystems 804, on-chip resources 806, translation unit 204 and the second I/O controller 124.

According to various embodiments of the disclosed technologies, the on-chip resources 806 and the off-chip resources 808 may be mapped to the host address space in the host system 102 as peripheral bus functions. For example, the peripheral bus functions may be PCIe functions, USB functions or any suitable peripheral bus function. The translation unit 204 may be configured to translate an address between the SoC address space and the host address space for a transaction to facilitate performing the transaction using the host address space. For example, in some embodiments, the transaction may be initiated by a host system for a resource from the on-chip resources 806 or the off-chip resources 808. In some embodiments, a transaction may be initiated by a first resource that may be targeted for a second resource. The first and the second resource may be from the on-chip resources 806 or the off-chip resources 808.

Figure 9:
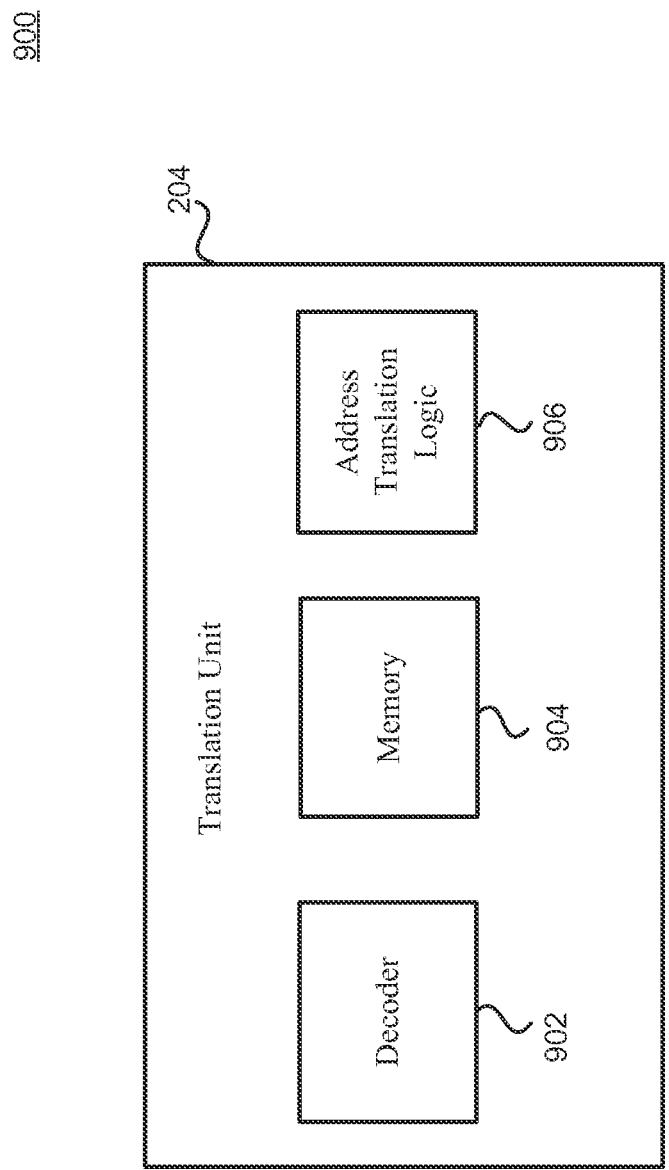
FIG. 9 illustrates a block diagram of a translation unit, according to one embodiment of the disclosed technology.

FIG. 9 illustrates a block diagram of a translation unit 900, according to some embodiments of the disclosed technology. In different embodiments, the translation unit can be configured to translate an address belonging to a host address space to an address belonging to an SoC address space or vice-versa.

In one embodiment of the disclosed technology, the translation unit 204 may include a decoder 902, a memory 904 and an address translation logic 906. It will be understood that the translation unit 204 may include more or less components than shown in FIG. 9. Further, one or more components of the translation unit 204 can be implemented in hardware, software or a combination of hardware and software.

The decoder 902 may be implemented to perform decoding of the transactions. In some implementations, the decoder 902 may decode an address associated with a transaction to determine a target address for the transaction, e.g., if the address for the transaction corresponds to an address range in the host address space or an address range in the SoC address space. In some embodiments, the decoder 902 may further decode the address to determine if the transaction belongs to an SoC address range that may be direct mapped to the host address space. For example, the transaction may be targeted for the host system 102 or for one or more resources for the SoC 202. For example, the target resource may be a memory or a peripheral on the SoC 202, or a memory device or a peripheral device coupled to the SoC 202. In some embodiments, the transaction may involve access to the configuration space or to the MMIO address space for a resource.

The memory 904 may be used to store different mapping configurations for the one or more resources for the SoC 202. For example, the different mapping configurations may be based on the particular peripheral bus function used for the mapping, e.g., PCIe function or the USB function. The memory 904 may be a volatile or a non-volatile memory, e.g., DRAM, ROM, etc. In some embodiments, the different mapping configurations may be provided during power-up of the SoC 202.

The address translation logic 906 may be implemented to translate an address belonging to a host address space to an address belonging to an SoC address space or to translate an address belonging to an SoC address space to a host address space. In some implementations, the address translation logic 906 may translate the addresses based on a mapping configuration stored in the memory 904. In some embodiments, the address translation logic 906 may perform the translation between the host address space (both configuration space and the MMIO address space) and the SoC address space for each resource coupled to the SoC 202.

Figure 10:
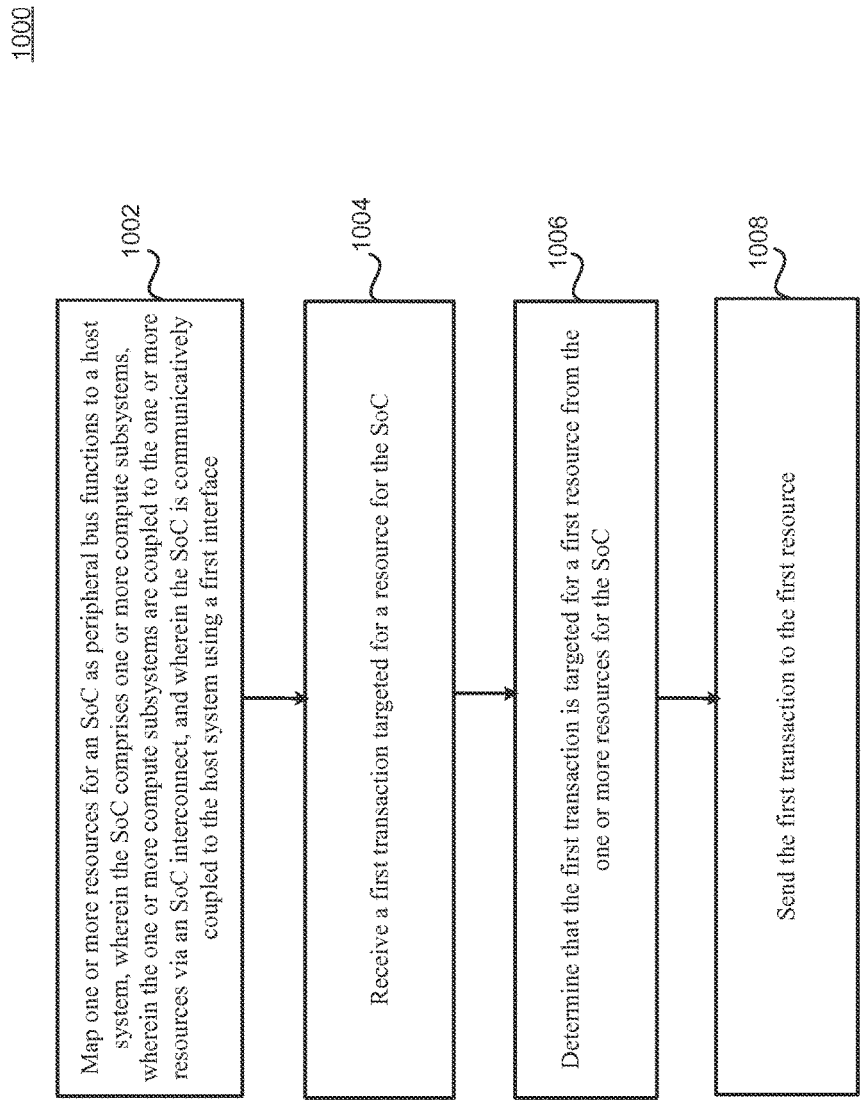
FIG. 10 illustrates a flow diagram according to one or more aspects of the disclosed technology.

FIG. 10 illustrates a flow diagram 1000 according to one or more aspects of the disclosed technology. Some or all of the process 1000 (or any other processes described herein, or variations and/or combinations thereof) may be performed under the control of one or more computer systems configured with executable instructions and may be implemented as code (e.g., firmware, executable instructions, one or more computer programs or one or more applications) executing collectively on one or more processors, or by hardware or combinations thereof. The code may be stored on a computer-readable storage medium, for example, in the form of a computer program that may include a plurality of instructions executable by one or more processors. The computer-readable storage medium may be non-transitory.

At step 1002, one or more resources for an SoC may be mapped as peripheral bus functions to a host system. The SoC may comprise one or more compute subsystems and an SoC interconnect. The one or more compute subsystems may be coupled to the one or more resources via the SoC interconnect. Further, the SoC may be communicatively coupled to the host system using a first interface. In some implementations, the peripheral bus functions may include PCIe functions, USB functions or any other suitable peripheral bus function. In some embodiments, the one or more resources for an SoC may be mapped as peripheral bus functions to one or more host address spaces in the host system. Referring back to FIG. 2 and FIG. 8, one or more resources for the SoC 202 or the SoC 802 may be mapped as peripheral bus functions to the one or more host address spaces in the host system 102, e.g., the host address space 702 as discussed with reference to FIG. 7A. For example, the one more resources for the SoC 802 may include on-chip resources 806 and the off-chip resources 808. The one or more resources for the SoC may also be mapped to a SoC address space, as discussed with reference to FIG. 7B. In some embodiments, the SoC may implement configuration space and memory mapped IO space in order to map one or more resources as peripheral bus functions.

At step 1004, a first transaction targeted for a resource for the SoC can be received. For example, in one embodiment, a first transaction initiated by the host system 102 can be received to access a first peripheral device from the peripheral devices 116, as discussed with reference to FIG. 2. In another embodiment, a first transaction initiated by the host system 102 can be received to access a resource on the SoC 202, e.g., the storage memory controller 126, as discussed with reference to FIG. 3. In some embodiments, a first transaction initiated by a first resource for the SoC 202 can be received to access a second resource for the SoC 202. For example, referring back to FIG. 4, in one embodiment, a first transaction targeted for the second peripheral device 404 can be received that may be initiated by the first peripheral device 402. In another embodiment, a first transaction targeted for the first peripheral device 402 can be received that may be initiated by the storage memory controller 126, as discussed with reference to FIG. 5. In another embodiment, a first transaction targeted for the memory controller 122 can be received that may be initiated by the storage memory controller 126, as discussed with reference to FIG. 6.

At step 1006, it can be determined that that the first transaction is targeted for a first resource from the one or more resources for the SoC. In some implementations, the translation unit 204 may decode the address for the first transaction to determine a target address for the first transaction. For example, the translation unit 204 may determine if the address for the first transaction is mapped to a host address space (e.g., within the host address range 706 as discussed with reference to FIG. 7A) or to a SoC address space that is direct mapped to the host address space. In some embodiments, if it is determined that the first transaction is mapped to the host address space in the host system 102 (e.g., if the first transaction was initiated by the host system 102 that may be targeted for a resource for the SoC), the translation unit 204 may determine the first resource based on the corresponding address range of the first resource in the host address space. For example, referring back to FIG. 7A, if the address corresponds to the host address range 702A, the first resource may be resource 0, if the address corresponds to the host address range 702B, the first resource may be resource 1, and so on. In some embodiments, the translation unit 204 may translate the address of the first transaction belonging to the host address space to a target SoC address belonging to the SoC address space in the SoC based on the mapping. For example, in some embodiments, if it is determined that the first transaction is mapped to a SoC address space that is direct mapped to the host address space (e.g., if the first transaction was initiated by a second resource that may be targeted for the first resource), the translation unit 204 may drop one or more upper address bits of the address and determine the first resource based on the remaining address bits that may be direct mapped to the host address space.

At step 1008, the first transaction can be sent to the first resource. In some embodiments, the first transaction can be sent to the first resource at a target SoC address belonging to an SoC address space in the SoC. For example, in some implementations, the translation unit 204 can translate the address for the first transaction belonging to the host address space to a target SoC address belonging to the SoC address space to facilitate performing the first transaction with the first resource using the host address space. In some embodiments, the translation unit 204 can perform the address translation based on the mapping between the host addresses (or the peripheral bus functions) and the SoC addresses. For example, referring back to FIG. 7B, if the first resource is resource 0, the translation unit 204 can translate the address to a target SoC address belonging to the SoC address range 704A for resource 0, if the first resource is resource 1, the translation unit 204 can translate the address to a target SoC address belonging to the SoC address range 704B for resource 1, and so on. For example, in some implementations, the translation unit 204 can send the first transaction to an emulated device on the SoC 202 via the SoC interconnect 128 or to a peripheral device from the peripheral devices 116 via the SoC interconnect 128 and the second I/O controller 124. In some embodiments, a second transaction may be received by the first resource. In some embodiments, the translation unit 204 can determine that an address for the second transaction is direct mapped to the host address space and send the second transaction at a target host address belonging to the host address space. For example, in some implementations, the translation unit 204 can translate the address for the second transaction from the first resource belonging to the SoC address space that is direct mapped to the host address space to a target host address belonging to the host address space and send the second transaction to the target host address belonging to the host address space.

Embodiments of the disclosed technology can provide low latency high performance communication with one or more resources for an SoC. In some embodiments, one or more resources for the SoC can be directly mapped to a host address space as peripheral bus functions. A translation unit can provide translation between the host address space and the SoC address space for transactions targeted for a resource from the one or more resources to facilitate performing the transactions with the resource using the host address space. Some embodiments of the technology can provide peer to peer capability for communication between the SoC resources using the translation unit.

Figure 11:
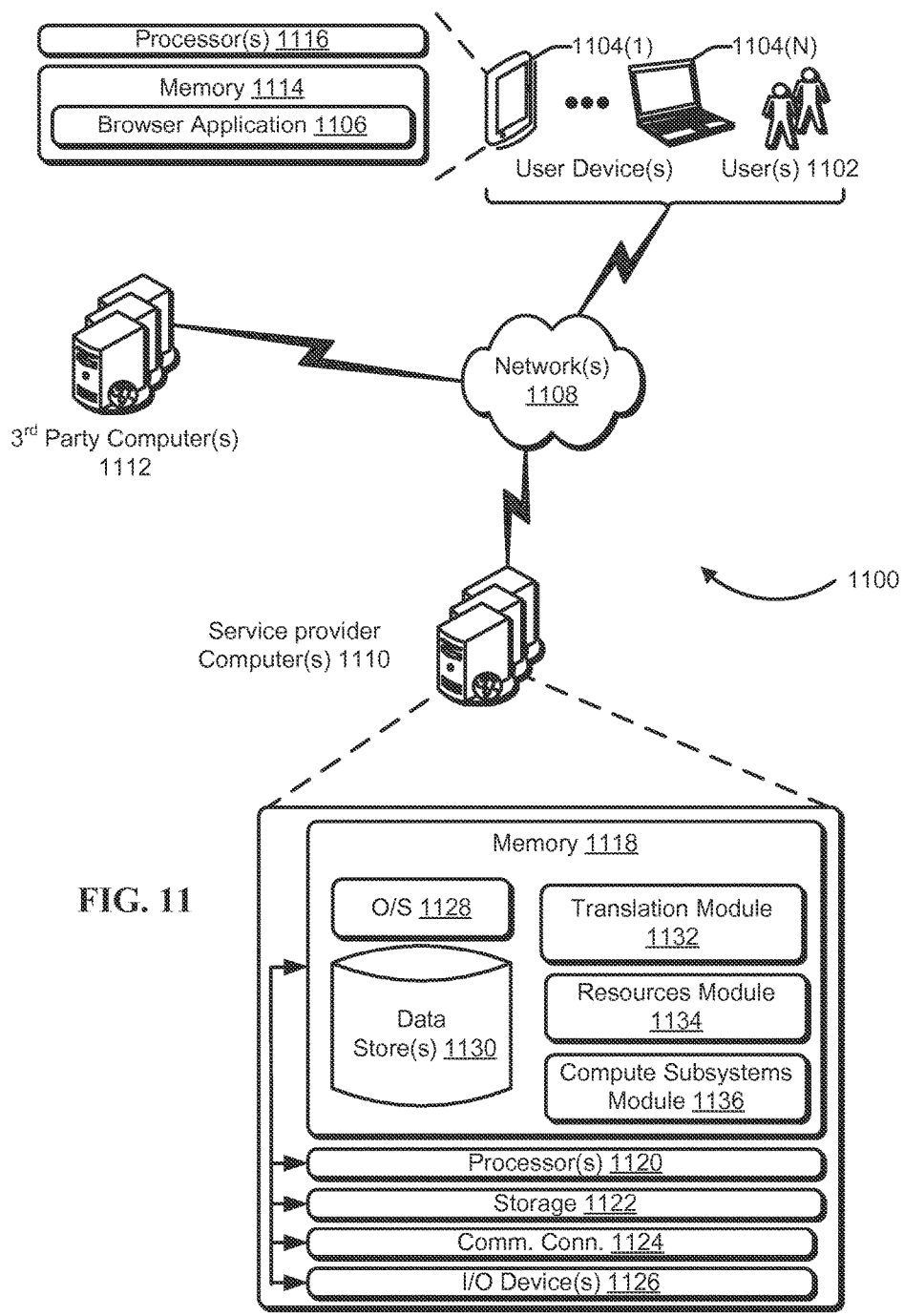
FIG. 11 illustrates an exemplary architecture for features and systems described herein that includes one or more service provider computers and/or a user device connected via one or more networks, according to at least one exemplary embodiment.

FIG. 11 illustrates an exemplary architecture for features and systems described herein that includes one or more service provider computers and/or a user device connected via one or more networks, according to at least one exemplary embodiment. The devices discussed in FIGS. 2-6 and 8 may use one or more components of the computing devices described in FIG. 11 or may represent one or more computing devices described in FIG. 11. In architecture 1100, one or more users 1102 may utilize user computing devices 1104(1)-(N) (collectively, user devices 1104) to access application 1106 (e.g., a web browser or mobile device application), via one or more networks 1108. In some aspects, application 1106 may be hosted, managed and/or provided by a computing resources service or service provider. One or more service provider computers 1110 may provide a native application which is configured to run on user devices 1104 which user(s) 1102 may interact with. Service provider computer(s) 1110 may, in some examples, provide computing resources such as, but not limited to, client entities, low latency data storage, durable data storage, data access, management, virtualization, cloud-based software solutions, electronic content performance management, etc. Service provider computer(s) 1110 may also be operable to provide web hosting, computer application development and/or implementation platforms, combinations of the foregoing or the like to user(s) 1102. Service provider computer(s) 1110, in some examples, may communicate with one or more third party computers 1112.

In some examples, network(s) 1108 may include any one or a combination of many different types of networks, such as cable networks, the Internet, wireless networks, cellular networks and other private and/or public networks. While the illustrated example represents user(s) 1102 accessing application 1106 over network(s) 1108, the described techniques may equally apply in instances where user(s) 1102 interact with service provider computer(s) 1110 via a user device(s) 1104 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 1106 may allow user(s) 1102 to interact with service provider computer(s) 1110 such as to access web content (e.g., web pages, music, video, etc.). Service provider computer(s) 1110, perhaps arranged in a cluster of servers or as a server farm, may host application 1106 and/or cloud-based software services. Other server architectures may also be used to host application 1106. Application 1106 may be capable of handling requests from many users 1102 and serving, in response, various item web pages. Application 1106 can provide any type of website that supports user interaction, including social networking sites, online retailers, informational sites, blog sites, search engine sites, news and entertainment sites and so forth. As discussed above, the described techniques can similarly be implemented outside of application 1106, such as with other applications running on user device(s) 1104.

User device(s) 1104 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 1104 may be in communication with service provider computer(s) 1110 via network(s) 1108, or via other network connections. Additionally, user device(s) 1104 may be part of the distributed system managed by, controlled by, or otherwise part of, service provider computer(s) 1110 (e.g., a console device integrated with service provider computers 1110).

In one illustrative configuration, user device(s) 1104 may include at least one memory 1114 and one or more processing units (or processor(s)) 1116. Processor(s) 1116 may be implemented as appropriate in hardware, computer-executable instructions, firmware, or combinations thereof. Computer-executable instruction or firmware implementations of processor(s) 1116 may include computer-executable or machine-executable instructions written in any suitable programming language to perform the various functions described. User device(s) 1104 may also include geo-location devices (e.g., a global positioning system (GPS) device or the like) for providing and/or recording geographic location information associated with user device(s) 1104.

Memory 1114 may store program instructions that are loadable and executable on processor(s) 1116, as well as data generated during the execution of these programs. Depending on the configuration and type of user device(s) 1104, memory 1114 may be volatile (such as random access memory (RAM)) and/or non-volatile (such as read-only memory (ROM), flash memory, etc.). User device(s) 1104 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 1114 may include multiple different types of memory, such as static random access memory (SRAM), dynamic random access memory (DRAM), or ROM.

Turning to the contents of memory 1114 in more detail, memory 1114 may include an operating system and one or more application programs or services for implementing the features disclosed herein including at least a user provided input element or electronic service web page, such as via browser application 1106 or dedicated applications (e.g., smart phone applications, tablet applications, etc.). Browser application 1106 may be configured to receive, store and/or display a website or other interface for interacting with service provider computer(s) 1110. Additionally, memory 1114 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 1104.

In some aspects, service provider computer(s) 1110 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 1110 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 1110 may be in communication with user device(s) 1104 and/or other service providers via network(s) 1108, or via other network connections. Service provider computer(s) 1110 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 1110 may include at least one memory 1118 and one or more processing units (or processor(s)) 1120. Processor(s) 1120 may be implemented as appropriate in hardware, computer-executable instructions, firmware or combinations thereof. Computer-executable instruction or firmware implementations of processor(s) 1120 may include computer-executable or machine-executable instructions written in any suitable programming language to perform the various functions described.

In some instances, hardware processor(s) 1120 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 1118 may store program instructions that are loadable and executable on processor(s) 1120, as well as data generated during the execution of these programs. Depending on the configuration and type of service provider computer(s) 1110, memory 1118 may be volatile (such as RAM) and/or non-volatile (such as ROM, flash memory, etc.). Service provider computer(s) 1110 or servers may also include additional storage 1122, which may include removable storage and/or non-removable storage. The additional storage 1122 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 1118 may include multiple different types of memory, such as SRAM, DRAM, or ROM.

Memory 1118, the additional storage 1122, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 1118 and the additional storage 1122 are all examples of computer storage media. Additional types of computer storage media that may be present in service provider computer(s) 1110 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 1110. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 1110 may also contain communications connection(s) 1124 that allow service provider computer(s) 1110 to communicate with a stored database, another computing device or server, user terminals and/or other devices on network(s) 1108. Service provider computer(s) 1110 may also include SoC(s) 1126, such as a keyboard, a mouse, a pen, a voice input device, a touch input device, a display, speakers, a printer and the like.

Memory 1118 may include an operating system 1128, one or more data stores 1130 and/or one or more application programs or services for implementing the features disclosed herein, including optionally a translation module 1132, a resources module 1134 and a compute subsystems module 1136. The modules described herein may be software modules, hardware modules or a suitable combination thereof. If the modules are software modules, the modules can be embodied on a non-transitory computer readable medium and processed by a processor in any of the computer systems described herein. In some embodiments, referring back to FIG. 2, the translation module 1132 may include the functionalities of the translation unit 204. The resources module 1134 may include one or more resources for the SoC 202. It should be noted that the described processes and architectures can be performed either in real-time or in an asynchronous mode prior to any user interaction. The modules may be configured in the manner suggested in FIG. 11, and/or functions described herein can be provided by one or more modules that exist as separate modules and/or module functions described herein can be spread over multiple modules.

Figure 12:
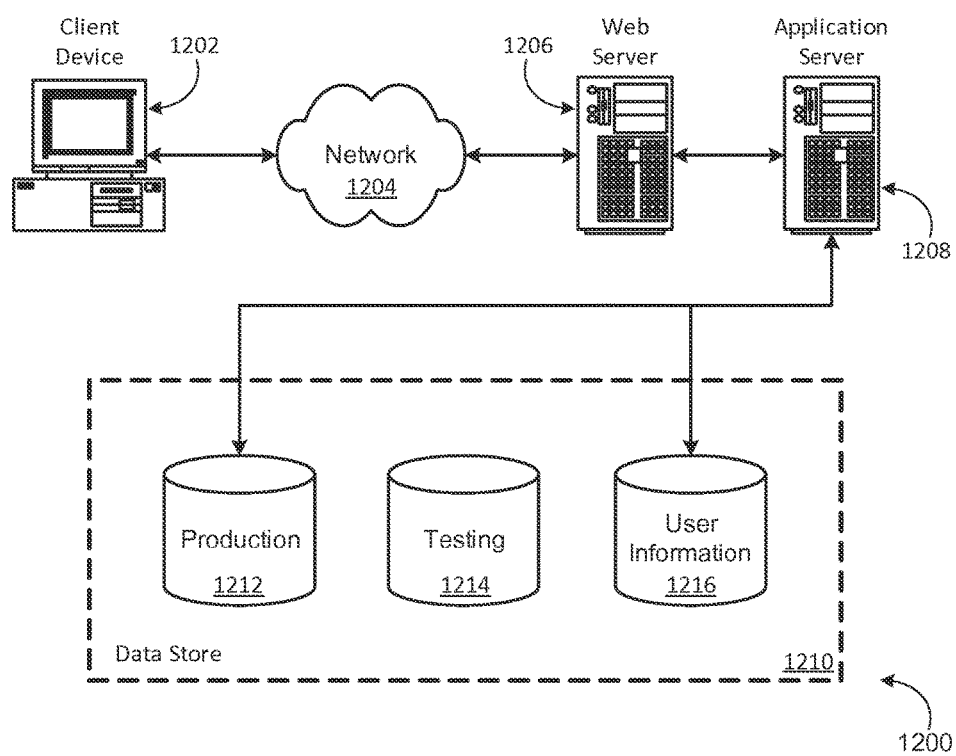
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as for page image information and to access right information, which can be stored in any of the above-listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including, without limitation, those commercially available from Oracle, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system on a chip (SoC) configured as an input/output device for a host system, the SoC comprising:
    an on-chip hardware resource;
    an interface for an off-chip hardware resource coupled to the SoC,
        wherein the on-chip hardware resource or the off-chip hardware resource is mapped to a host address space in the host system and to an SoC address space in the SoC;
    a compute subsystem comprising a processor, the processor coupled to the on-chip hardware resource via an SoC interconnect, wherein the processor maintains a paging table used in translating addresses between the host address space and the SoC address space; and
    a translation unit for providing translations between the host address space and the SoC address space for transactions to be processed by the processor, the translation unit coupled to the on-chip hardware resource via the SoC interconnect, the translation unit configured to:
        receive a first transaction targeted for a resource associated with the SoC;
        determine that the first transaction is targeted for the on-chip hardware resource or the off-chip hardware resource;
        determine that an address for the first transaction belongs to the host address space; and
        translate the address for the first transaction from the host address space to a target SoC address belonging to the SoC address space to facilitate performing of the first transaction with the resource using the host address space and without communicating with the processor.

2. The SoC of claim 1, wherein the translation unit is further configured to translate an address for a second transaction belonging to the SoC address space to a target host address belonging to the host address space, wherein the second transaction is initiated by the resource.

3. The SoC of claim 1, wherein the on-chip hardware resource and the off-chip hardware resource is mapped as a respective peripheral bus function in the host address space.

4. The SoC of claim 1, wherein the first transaction is from the host system to the resource.

5. The SoC of claim 1, wherein the resource is the on-chip hardware resource and wherein the first transaction is from the off-chip hardware resource to the first on-chip hardware resource.

6. The SoC of claim 1, wherein the SoC address space is mapped to a memory communicatively coupled to the processor and the host address space is mapped to a host memory on the host system.

7. A system on a chip (SoC) comprising:
    an on-chip resource;
    an interface for an off-chip resource coupled to the SoC, wherein the on-chip resource or the off-chip resource is mapped to a host address space in a host system and to an SoC address space in the SoC;
    a compute subsystem comprising a processor, the processor coupled to the on-chip resource via an SoC interconnect, wherein the processor maintains a paging table used in translating addresses between the host address space and the SoC address space; and
    a translation unit for providing translations between the host address space and the SoC address space for transactions to be processed by the processor, the translation unit coupled to the on-chip resource via the SoC interconnect, the translation unit configured to translate an address belonging to the host address space, the address being for a first transaction targeted for the on-chip resource or the off-chip resource, wherein the translation unit translates the address belonging to the host address space to a target SoC address belonging to the SoC address space to facilitate performing of the first transaction with the resource using the host address space and without communicating with the processor.

8. The SoC of claim 7, wherein the translation unit is further configured to translate an address for a second transaction belonging to the SoC address space to a target host address belonging to the host address space, wherein the second transaction is initiated by the resource.

9. The SoC of claim 7, wherein the on-chip resource and the off-chip resource is mapped as a respective peripheral bus function in the host address space.

10. The SoC of claim 9, wherein the respective peripheral bus function is a PCIe function.

11. The SoC of claim 7, wherein the first transaction is from the host system to the resource.

12. The SoC of claim 7, wherein the first transaction is from another on-chip resource or another off-chip resource to the resource.

13. The SoC of claim 7, wherein the resource is coupled to the SoC.

14. The SoC of claim 7, wherein the resource is a PCIe resource.

15. The SoC of claim 7, wherein the resource is an emulated PCIe resource.

16. The SoC of claim 7, further comprising a first I/O controller and a second I/O controller coupled to the translation unit, wherein the first I/O controller is configured to communicate with the host system using a first interface and the second I/O controller is configured to communicate with the resource using a second interface.

17. The SoC of claim 7, wherein the SoC address space is mapped to a memory communicatively coupled to the processor and the host address space is mapped to a host memory on the host system.

18. A method for performing a transaction with a system on a chip (SoC), the method comprising:
- mapping resources for the SoC as peripheral bus functions to a host address space in a host system, wherein the SoC comprises a compute subsystem comprising a processor, the processor communicatively coupled to the resources via an SoC interconnect, wherein the processor maintains a paging table used in translating addresses between the host address space and an SoC address space, and wherein the SoC is communicatively coupled to the host system using a first interface;
- receiving a first transaction for the SoC;
- determining that the first transaction is targeted for a first resource from the resources for the SoC;
- translating an address of the first transaction belonging to the host address space to a target SoC address belonging to the SoC address space in the SoC based on the mapping, and without communicating with the processor; and
- sending the first transaction to the first resource.

19. The method of claim 18, the method further comprising:
- receiving a second transaction, the second transaction being initiated by the first resource;
- determining that the second transaction is targeted to the host system;
- translating an address of the second transaction belonging to the SoC address space to a target host address belonging to the host address space based on the mapping, and without communicating with the processor; and
- sending the second transaction to the host system.

20. The method of claim 18, wherein the first transaction is from the host system to the first resource of the resources.

* * * * *